(12) United States Patent  
Miyao

(10) Patent No.: US 12,272,320 B2
(45) Date of Patent: Apr. 8, 2025

(54) TRANSPARENT DISPLAY APPARATUS

(71) Applicant: Japan Display Inc., Tokyo (JP)

(72) Inventor: Makoto Miyao, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/405,214

(22) Filed: Jan. 5, 2024

(65) Prior Publication Data

US 2024/0242683 A1 Jul. 18, 2024

(30) Foreign Application Priority Data

Jan. 12, 2023 (JP) ................... 2023-003284

(51) Int. Cl.
*G09G 3/34* (2006.01)
*G06F 3/01* (2006.01)
*G09G 3/36* (2006.01)

(52) U.S. Cl.
CPC ........... *G09G 3/3406* (2013.01); *G06F 3/013* (2013.01); *G09G 3/36* (2013.01); *G09G 2354/00* (2013.01); *G09G 2360/144* (2013.01)

(58) Field of Classification Search
CPC .... G09G 3/3406; G09G 3/36; G09G 2354/00; G09G 2360/144; G09G 3/20; G09G 3/34; G06F 3/013
See application file for complete search history.

(56) References Cited

U.S. PATENT DOCUMENTS

| | | | | |
|---|---|---|---|---|
| 9,230,510 B1* | 1/2016 | Sivertsen | .................. | G09G 5/14 |
| 9,293,515 B2* | 3/2016 | Choi | .................... | H10K 59/128 |
| 9,721,490 B2* | 8/2017 | Yang | ....................... | G09G 3/003 |
| 10,056,048 B2* | 8/2018 | Kim | .................. | G02F 1/133512 |
| 10,453,403 B2* | 10/2019 | Kato | ......................... | G02F 1/137 |
| 10,789,885 B1* | 9/2020 | Hrehor, Jr. | ............ | G09G 3/3225 |
| 11,243,735 B2* | 2/2022 | Lim | ......................... | G09G 5/36 |
| 11,438,652 B2* | 9/2022 | Nezu | ..................... | G06V 40/166 |
| 2011/0148944 A1* | 6/2011 | Kobayashi | ........... | H10K 59/128 |
| | | | | 345/690 |
| 2012/0242865 A1* | 9/2012 | Vartanian | ................ | G09G 3/002 |
| | | | | 348/E5.051 |
| 2013/0249873 A1* | 9/2013 | Zhang | ...................... | G09G 3/20 |
| | | | | 345/204 |
| 2014/0049449 A1* | 2/2014 | Park | ........................ | G09G 3/035 |
| | | | | 29/841 |
| 2014/0139458 A1* | 5/2014 | Premutico | ............ | H10K 59/121 |
| | | | | 345/82 |
| 2014/0204039 A1* | 7/2014 | Miller | .................. | G09G 3/2003 |
| | | | | 345/694 |

(Continued)

FOREIGN PATENT DOCUMENTS

JP 2018-120022 A 8/2018

*Primary Examiner* — William Lu

(74) *Attorney, Agent, or Firm* — Michael Best & Friedrich LLP

(57) ABSTRACT

A transparent display apparatus includes a display layer provided in a display region where a first substrate, a second substrate, and a display layer overlap, and a controller controlling a state of pixels of the display layer, an image displayed in the display region from a first surface side of the first substrate and a background on the first surface side are visible, and the controller controls state of first lighting, which lightens an inside of a first space, in causing the display layer to display the image toward a first user in the first space on the first surface side.

10 Claims, 14 Drawing Sheets

(56) References Cited

U.S. PATENT DOCUMENTS

| | | | |
|---|---|---|---|
| 2015/0116364 A1* | 4/2015 | Aurongzeb | G06F 1/1649 |
| | | | 345/659 |
| 2015/0130738 A1* | 5/2015 | Park | G06F 3/1423 |
| | | | 345/173 |
| 2017/0060512 A1* | 3/2017 | Rakshit | G06F 3/041 |
| 2017/0153379 A1* | 6/2017 | Chang | G02B 6/0081 |
| 2017/0301288 A1* | 10/2017 | Perdices-Gonzalez | |
| | | | G09G 3/3208 |
| 2018/0061313 A1* | 3/2018 | Jang | G06F 1/1643 |
| 2018/0275943 A1* | 9/2018 | Ono | G09G 5/14 |
| 2019/0013377 A1* | 1/2019 | Nie | G09G 3/3225 |
| 2020/0234503 A1* | 7/2020 | Forsland | G06T 19/006 |

\* cited by examiner

FIG. 4
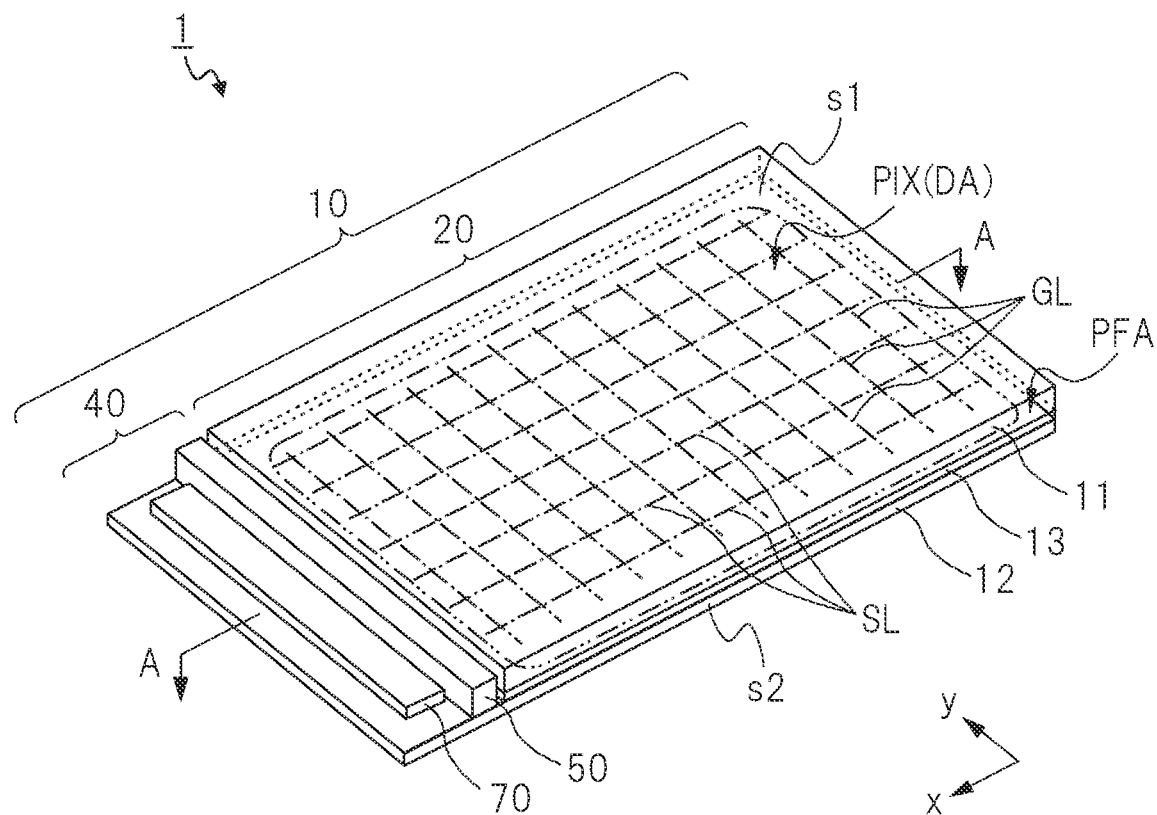
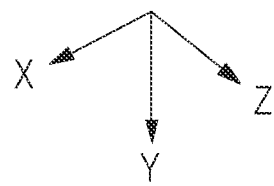

FIG. 5
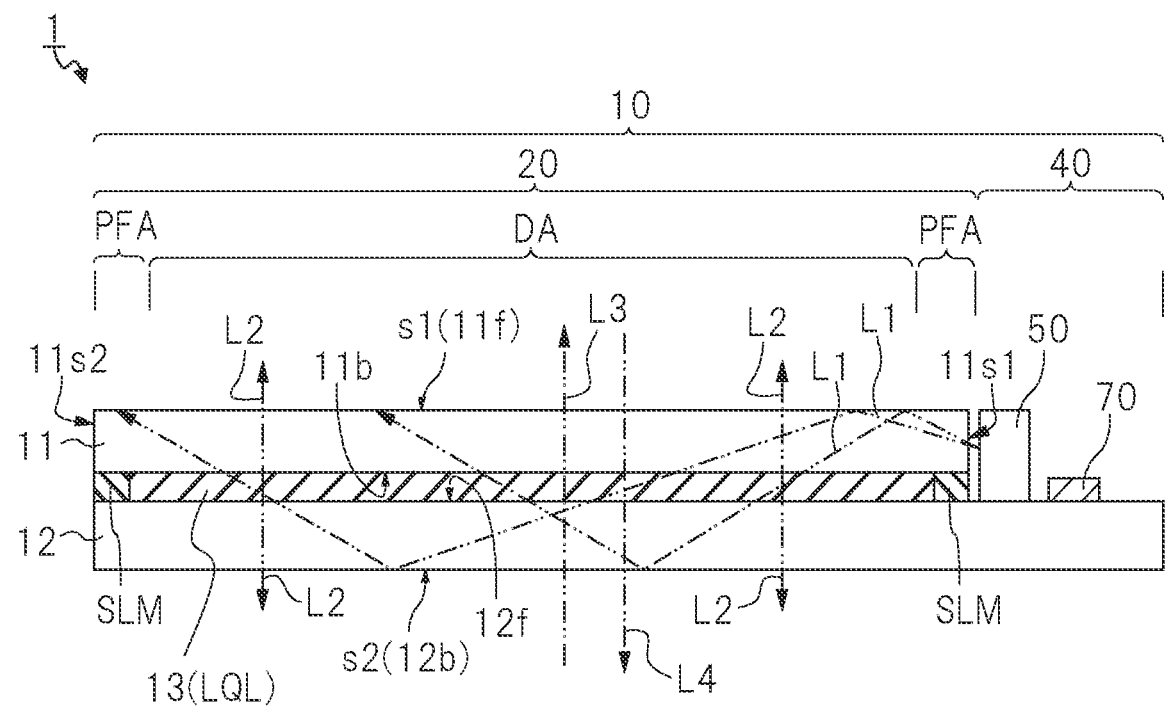
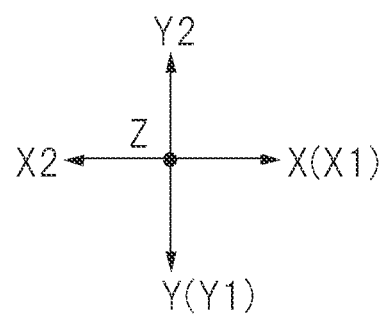

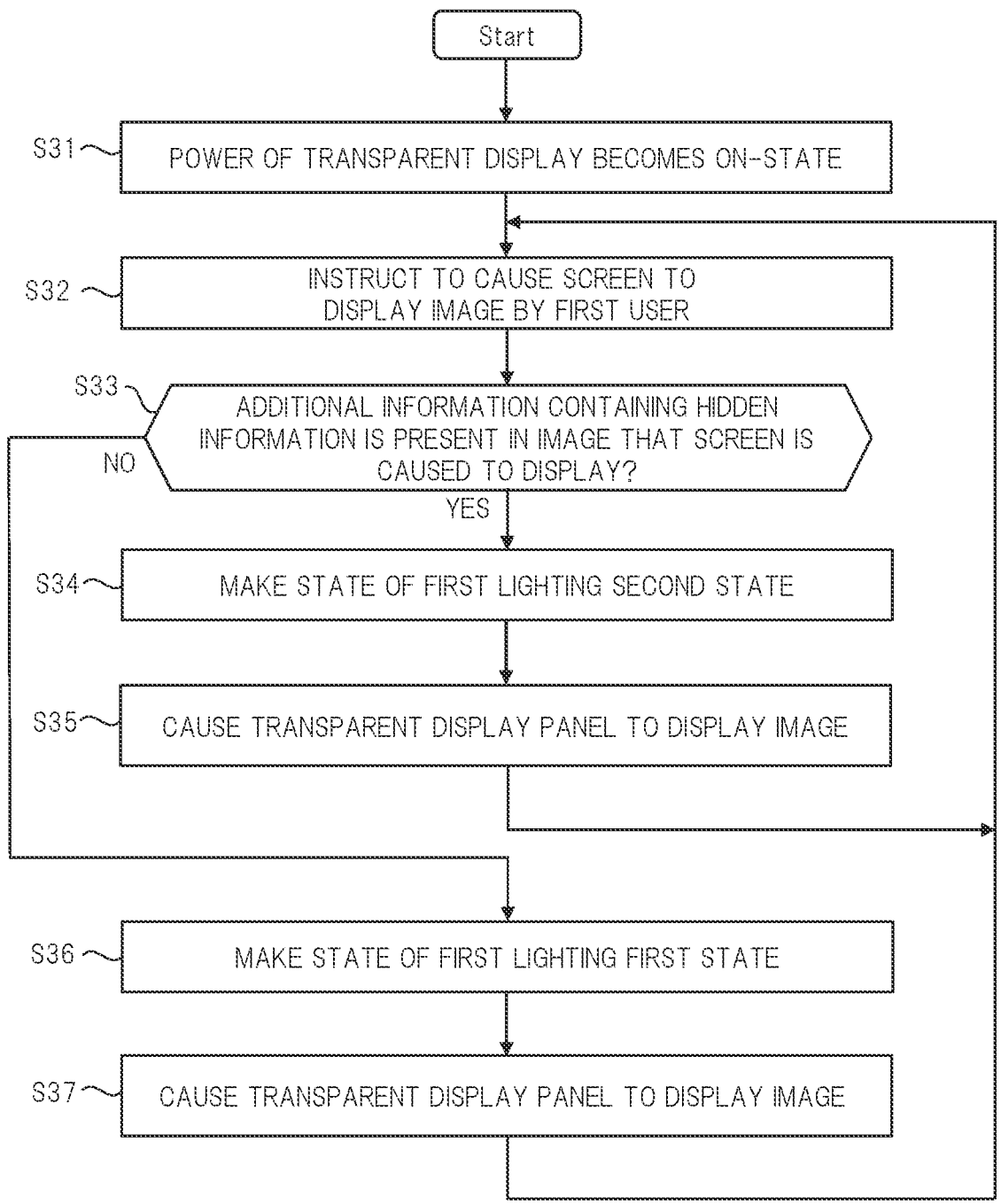

TRANSPARENT DISPLAY APPARATUS

CROSS-REFERENCE TO RELATED APPLICATION

The present application claims priority from Japanese Patent Application No. 2023-3284 filed on Jan. 12, 2023, the content of which is hereby incorporated by reference into this application.

TECHNICAL FIELD

The present invention relates to a transparent display apparatus.

BACKGROUND

In recent years, transparent display apparatuses (in other words, transparent displays) have been developed and provided. The transparent display apparatus displays images (in other words, video images or the like) in a light-transmissive display region made of a liquid crystal layer or the like. A person who is a user can visually recognize display images of the transparent display apparatus from a front surface side and a back surface side in a state of superimposing it with a background (see, for example, Patent Document 1 (Japanese Patent Application Laid-on No. 2018-120022)). This Patent Document 1 discloses an example of a transparent display that improves the visibility of the background by enhancing transparency of the display region for displaying the image.

SUMMARY

It is conceivable that the transparent display apparatus can be used for many use applications related to the communication between the people, and further technological development for this purpose is desired.

An object of the present invention is to provide a technique capable of extending the use application.

A transparent display apparatus that is one embodiment of the present invention includes: a first substrate having a first surface; a second substrate having a second surface on an opposite side of the first surface; a display layer arranged between the first substrate and the second substrate and having pixels that can transition between a transparent state transmitting background light and a non-transparent state displaying an image; a display region provided in a region where the first substrate, the second substrate, and the display layer overlap; a controller controlling a state of the pixels of the display layer; and the image displayed in the display region from a side of the first surface and a background on a side of the second surface being visible, and the image displayed in the display region from a side of the second surface and the background on the first surface side being visible, in which the controller controls a state of a first lighting that illuminates an inside of the first space in causing the display layer to display the image toward a first user in the first space on the first surface side.

BRIEF DESCRIPTION OF THE DRAWINGS

FIG. 4 is a perspective view showing a hardware configuration example of the transparent display apparatus according to the first embodiment;

FIG. 5 is a cross-sectional view showing the transparent display apparatus of the first embodiment;

FIG. 15 is a diagram showing a flow of a image display processing in a transparent display apparatus of a third embodiment.

DESCRIPTION OF THE PREFERRED EMBODIMENTS

Figure 1:
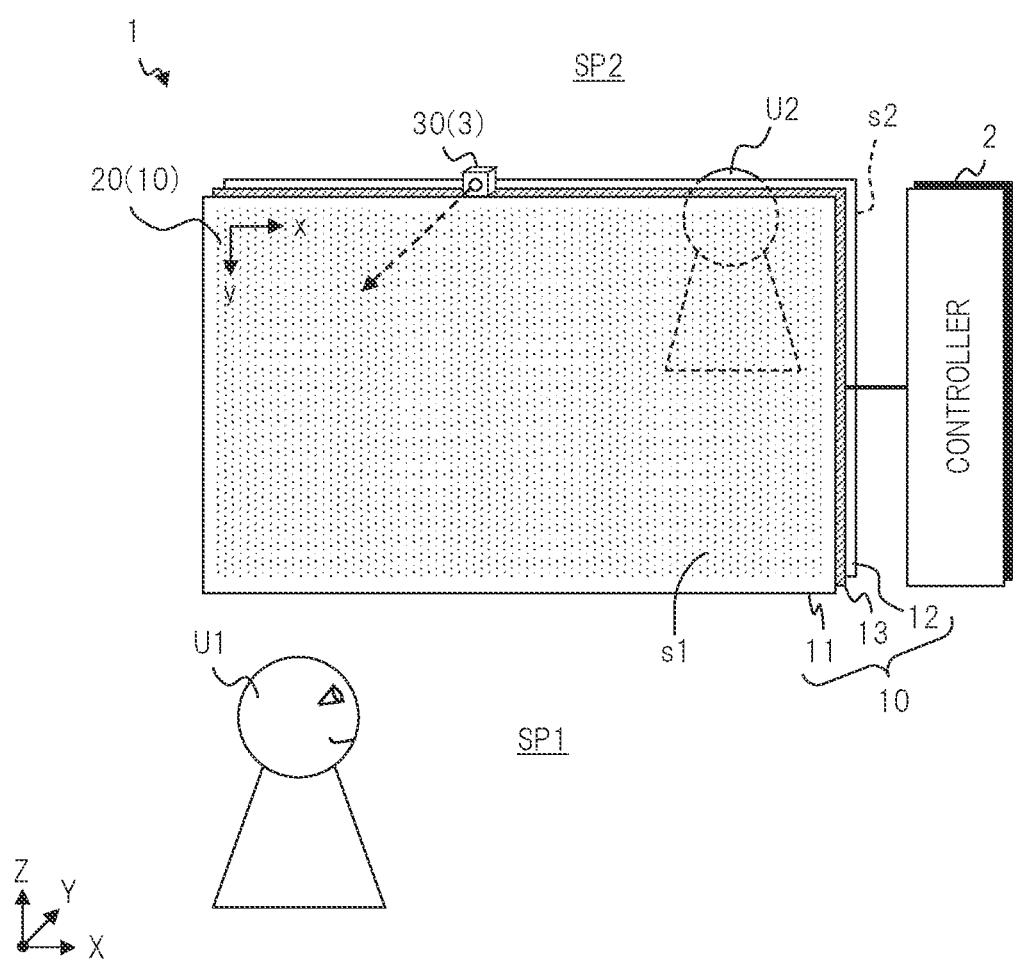
FIG. 1 is a diagram showing a configuration of a transparent display apparatus according to a first embodiment.

Hereinafter, embodiments of the present disclosure will be described in detail with reference to the drawings. In the drawings, the same parts are denoted by the same reference numerals in principle, and a repetitive description thereof will be omitted. In the drawings, in order to facilitate understanding of the invention, components may be schematically represented about a width, a thickness, a shape, and the like of each part in comparison with the actual aspect, but this is merely one example and it is not intended to limit the interpretation of the present invention.

For the purpose of explanation, when explaining processings by programs, the programs, functions, processing units, and the like may be explained as a main body, but the main body of hardware for these is a processor or is a controller configured by the processor and the like, a device, a calculator, a system, and the like. The calculator executes the processing according to a program read onto a memory by the processor while appropriately using resources such as a memory and a communication interface. This realizes predetermined functions, processing units, and the like. The processor is configured by, for example, a semiconductor device such as a CPU/MPU or a GPU. The processing is not limited to software program processing, and can also be implemented by using a dedicated circuit. As the dedicated circuit, FPGA, ASIC, CPLD, and the like can be applied.

A program(s) may be installed in advance as data on a target calculator, or may be distributed as data from a program source to the target calculator. The program source may be a program distribution server on a communication network or be a non-transitory computer-readable storage medium such as a memory card or a disk. A program may be configured by multiple modules. A computer system may be configured by multiple devices. The computer system may be configured by a client/server system, a cloud computing system, an IoT system, and the like. Various types of pieces of data and information are configured with, for example, a structure such as a table or a list, but are not limited thereto. Expressions such as identification information, identifier, ID, name, and number can be replaced with each other.

First Embodiment

In reference with FIGS. 1 to 12, a transparent display apparatus according to a first embodiment will be described. FIG. 1 is a drawing showing a schematic configuration of a transparent display apparatus according to a first embodiment.

Note that for the purpose of explanation, (X, Y, Z) and (x, y) shown in the drawings may be used as a coordinate system and a direction. A X axis/X direction and a Y axis/Y direction in FIG. 1 are two orthogonal horizontal directions, and a Z axis/Z direction is a vertical direction. The X direction is a right-left direction as seen from a user of the transparent display apparatus, the Z direction is an up-down direction as seen from the user, and the Y direction is a front-back direction as seen from the user. Further, the x direction in FIG. 1 is a longitudinal direction (in-screen horizontal direction) that configures a screen of a transparent display apparatus, and the y direction is a traverse direction (in-screen vertical direction) that configures the screen.

Overall of Transparent Display Apparatus

As shown in FIG. 1, a transparent display 1, which is a transparent display apparatus according to a first embodiment, is used by a first user U1 as a first operator and a second user U2 as a second operator user, and the user U1 and the second user U2 face each other so as to sandwich a transparent display panel 10 of the transparent display 1 therebetween. FIG. 1 schematically shows a situation in which the two users as a first user U1 and a second user U2 use the transparent display 1. In this example, the first user U1, who is a main user, uses the transparent display 1 from a first surface s1 side which is a front surface of the transparent display panel 10, and the second user U2 uses the transparent display 1 from a second surface s2 side which is a back surface of the transparent display panel 10. Of course, the first user U1 may use the transparent display 1 from the second surface s2 side, and the second user U2 may use, as the main user, the transparent display 1 from the first surface s1 side.

The transparent display 1 includes a light-transmissive display panel 10, a controller 2 connected to or built into the transparent display panel 10, and an eye tracking device 3 including a first camera 30 as a sensor device.

The transparent display panel 10 is, for example, a liquid crystal display panel. A screen 20 of the transparent display panel 10 is configured by a plurality of members. The transparent display panel 10 includes, for example, a first substrate 11, a second substrate 12, and a display layer 13 as members configuring the screen 20. The first substrate 11 is an opposite substrate, the second substrate 12 is an array substrate, and the display layer 13 is a liquid crystal layer. Pixels PIX of display layer 13 emit light in all directions. Although details will be described later, the display layer 13 has a plurality of pixels PIX that configure a display region of the screen 20 (see FIG. 4 or the like). Of course, the first substrate 11 may be used as an array substrate, and the second substrate 12 may be used as an opposite substrate.

In the first embodiment, the transparent display (in other words, a liquid crystal display) 1 having a liquid crystal layer as the display layer 13 of the transparent display panel 10 will be described. Note that in the first embodiment, used as the transparent display panel 10 of the transparent display 1 is a liquid crystal panel realizing a transmittance of 84% or more, the transmittance indicating a degree of transparency of the display region of the screen 20, the transmittance being about equal to the transmittance of a window glass.

The transparent display panel 10 has a first surface s1 on a first substrate 11 side and a second surface s2 on a second substrate 12 side. For the purpose of explanation, the first surface s1 is assumed to be a front surface (in other words, a front), and the second surface s2 is assumed to be a back surface (in other words, a back). By controlling the display layer 13, the transparent display 1 cannot only display an image toward the first user U1 on the first surface s1 side but also display an image toward the second user U2 on the second surface s2 side. In the transparent display 1, when the image is displayed on the screen 20 of the transparent display panel 10 according to the control of the display layer 13, the image can be visually recognized from not only the first user U1 on the first surface s1 side but also the second user U2 on the second surface s2 side s1. Note that in FIG. 1, the display image on the screen 20 is schematically shown as dot patterns.

The controller 2 is electrically connected to the transparent display panel 10, and controls the display layer 13 included in the transparent display panel 10. The controller 2 causes the screen 20 to display the image by controlling a display state of the pixels of the display layer 13 which is a liquid crystal layer. The controller 2 may be built into the transparent display panel 10 or may be connected to an outside of the transparent display panel 10. For example, in addition to a drive circuit or the like, a control circuit configurating the controller 2 may be mounted on a portion of the first substrate 11 or the second substrate 12. In addition thereto, The controller 2 may be an external computer such as a personal computer (PC) connected to the transparent display panel 10. Although not shown, a microphone, a speaker, a lamp, and the like may be installed and connected to the transparent display panel 10.

The eye tracking device 3 as the sensor device detects a viewpoint of the first user U1, who is the main user, on the first surface s1 side of the transparent display panel 10. The eye tracking device 3 a camera 30 photographing the image for detecting the viewpoint of the first user U1. The camera 30 is installed so as to face the first surface s1 side of the screen 20 and, by this camera 30, an image for identifying movement (in particular, movement of pupils) of an eye of the first user U1 is photographed. The camera 30 is provided, for example, at a top of the transparent display panel 10 so as to be able to photograph a face of the first user U1 from a front direction.

An installation location of the camera 30 is not particularly limited as long as it can capture the movement of the eye of the first user U1, and the location does not necessarily have to be on the transparent display panel 10. The camera 30 is a CCD camera or the like in this example, but is not limited to this, and may be any camera that can photograph the movement of the eye of the first user U1. Further, in this example, the camera 30 transmits the photographed image to the controller 2, and the controller 2 performs an image processing based on the photographed image (in other words, camera image), thereby detecting the viewpoint of the first user U1, more specifically, a viewpoint on the screen 20 based on the visual line of the first user U1. That is, the controller 2 also functions as part of the eye tracking device 3.

Note that the existing device 3 may adopt an already-existing device(s), and its configuration is not particularly limited. As one example, the eye tracking device 3 analyzes the image photographed by the camera 30, and detects the viewpoint of the first user U1 from the movement of the eyes (in particular, the movement of the pupils) of the first user U1. Further, the eye tracking device 3 may detect the viewpoint (in other words, visual line direction) of the first user U1 by using corneal reflection of infrared rays, for example.

Furthermore, the transparent display 1 can switch at least between a transparent state of transmitting the background and a non-transparent state of displaying the image for each pixel on the screen 20 of the transparent display panel 10. In other words, the transparent display 1 can switch, as control of transparency of the transparent display panel 10, a transparent state where the transparency is in an on state and a non-transparent state where the transparency is in an off state. The non-transparent state is a state in which the image displayed on the screen 20 is easier for the user to visually recognize than the background in comparison with the transparent state, and the transparent state is a state in which the image displayed on the screen 20 is easier for the user to visually recognize than the background. Furthermore, the transparent state may simply be referred to as an image non-display state, and the non-transparent state may be referred to as an image display state, or the transparent state may be replaced as a non-scattering state, and the non-transparent state may be replaced as a scattering state, as will be described later. Note that the control for each pixel of the screen 20 by the transparent display 1 is limited to changing the degree of transparency (sometimes referred to as transparency) between the transparent state and the non-transparent state by using a binary value of on/off, and it may be changed in multiple values.

Such a transparent display 1 can be installed and used at any position as, for example, a partition separated between people. As one example, the transparent display 1 is installed, for example, at a counter, window, or the like where people meet, thereby being used effectively.

In the first embodiment, the transparent display 1 is installed to a boundary portion between a first space SP1 on the first substrate 11 side with respect to the display layer 13 and a second space SP2 on the second substrate 12 side with respect to the display layer 13. The transparent display 1 displays the image of the display layer 13 toward the first user U1 or the second user 2, for example, based on an operation of the first user U1 in the first space SP1.

Basic Characteristics of Transparent Displays

Figure 2A:
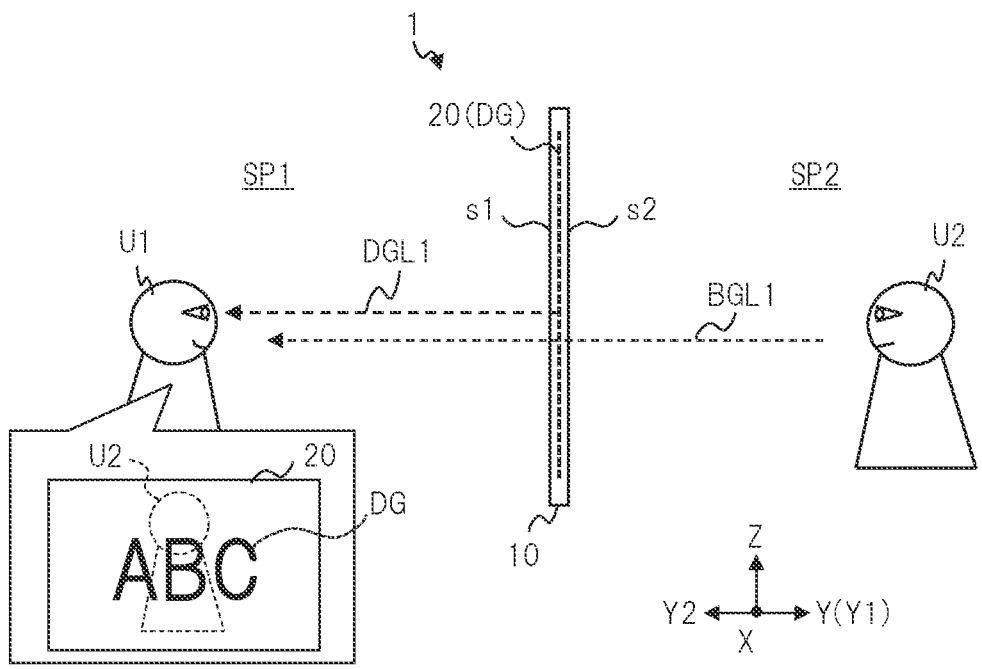
FIG. 2A is a diagram for explaining a basic characteristic of the transparent display apparatus of the first embodiment.
Figure 2B:
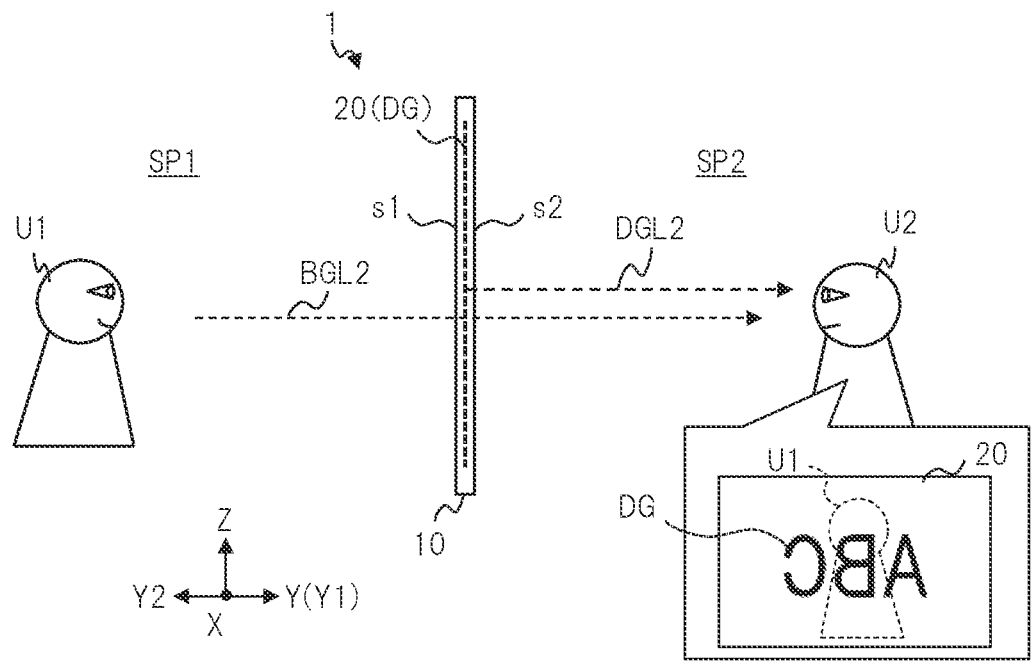
FIG. 2B is a diagram for explaining the basic characteristic of the transparent display apparatus of the first embodiment.

FIG. 2 is a diagram of the transparent display panel viewed in the X direction, and is a diagram for explaining the state of the display image displayed on the screen. FIG. 2A shows a state in which the first user U1 located on a front side (direction Y2) with respect to the first surface s1, which is the front surface of the transparent display 1, visually recognizes a display image DG displayed on the screen 20. On the contrary, FIG. 2B shows a state in which the second user U2 located on the front side (direction Y1) with respect to the second surface s2, which is the back surface of the transparent display 1, visually recognizes the display image DG displayed on the screen 20.

As described above, the transparent display 1 is such a display device to: allow the first user U1 to visually recognize the display image DG displayed on the screen 20 of the transparent display panel 10 from the first surface s1 side of the screen 20; and also allows the second user U2 to visually recognize the display image DG displayed on the screen 20 of the transparent display panel 10 from the second surface s2 of the screen 20.

The transparent display panel 10 has visible characteristics in which the display image DG displayed on the screen 20 and the second user U2 on the second surface s2 side can be visually recognized from the first user U1 in the first space SP1 on the first surface s1 side. The transparent display panel 10 also has visible characteristics in which the display image DG displayed on the screen 20 and the first user U1 on the first surface s1 side can be visually recognized from the second user U2 in the second space SP2 on the second surface s2 side. In the transparent display 1, when the image is displayed in the display region of the screen 20 toward the first user U1 in the first space SP1, the image is also visibly recognized from the second user U2 in the second space SP2 basically.

For example, as shown in FIG. 2, it is assumed that the transparent display 1 displays a character image of "ABC" toward the first surface s1 as the display image DG. The first user U1 views the screen 20 of the transparent display panel 10 in a direction (direction Y1) from the first surface s1 side to the second surface s2 side. Therefore, the first user U1 can visually recognize the display image DG on the screen 20, for example, the character image of "ABC" corresponding to image light DGL1, as shown in FIG. 2A. At this time, the first user U1 can visually recognize, via the screen 20, the second user U2 on the second surface s2 side and background light BGL1 corresponding thereto.

Meanwhile, the second user U2 views the screen 20 of the transparent display panel 10 in a direction (direction Y2) from the second surface s2 side to the first surface s1 side. The second user U2 can visually recognize the display image DG displayed on the screen 20, for example, the character image corresponding to image light DGL2, as shown in FIG. 2B. Further, the second user U2 can visually recognize, via the screen 20, the first user U1 on the first surface s1 side and background light BCL2 corresponding thereto.

The display image DG seen by the second user U2 is just the image viewed from the second surface s2 side of the screen 20, and is different from the display image DG viewed from the first surface s1 side. The display image DG viewed from the second user U2 is an image obtained by reversing the characters "ABC" in the right-left direction, as shown in FIG. 2B.

Note that at least the display region, in which the image is displayed, among the first surface s1 of the screen 20 has the above characteristics, in other words, background transparency. Similarly, at least the display region, in which the image is displayed, among the second surface s2 of the screen 20 has the above characteristics. A peripheral region (FIG. 4 described later) other than the display region among the first surface s1 and the second surface s2 of the screen 20 may be configured to have the same characteristics as mentioned above, or may be configured to have light-blocking characteristics of not transmitting the background.

In this way, the transparent display 1 has basic characteristics in which the first user U1 can visually recognize the display image DG displayed on the screen 20 of the transparent display 10 from the first surface s1 side of the screen 20, and the second user U2 can visually recognize it from the second surface s2 side of the screen 20, the display image DG displayed on the screen 20 of the transparent display 10.

Change in Appearance (Visual State) of Image by Luminance of Space and Screen

However, depending on a relationship between luminance of the first space SP1 and the second space SP2 and luminance of the screen 20, the first user U1 and the second user U2 may have difficulty in visually recognizing the image displayed on the screen 20, or may be unable to visually recognize it. Note that a state of having difficulty in visually recognizing the image is a state of being able to: recognize mere existence of the image displayed on the screen 20; and not understand contents of the image.

Figure 3A:
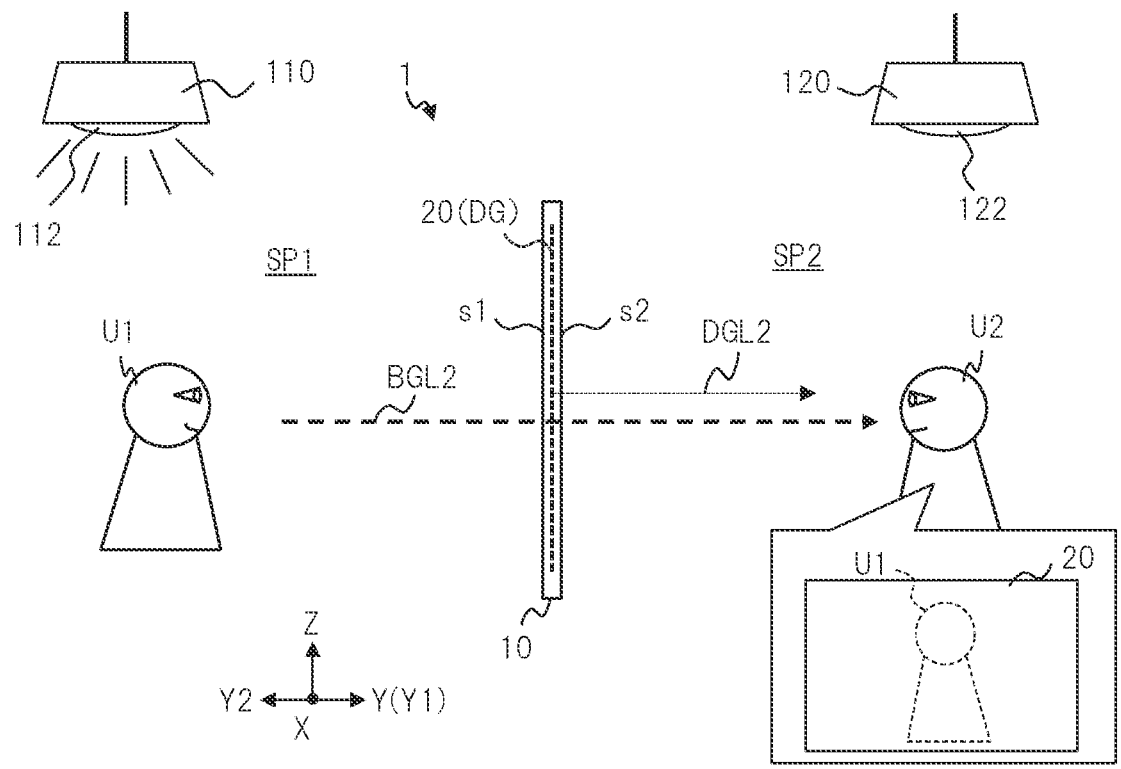
FIG. 3A is a diagram for explaining the basic characteristic of the transparent display apparatus of the first embodiment.

For example, as shown in FIG. 3A, it is assumed that a first lighting 110 in the first space SP1 where the first user U1 is present is lighted and luminance in the first space SP1 (in particular, near the transparent display panel 10) is brighter than luminance of the image (in other words, pixels for forming the image) displayed on the screen 20 of the transparent display 10. In this state, the second user U2 in the second space SP2 can visually recognize the first user U1, but may have difficulty in visually recognizing the character image of "ABC" displayed on the screen 20 or may be unable to visually recognize it. That is, if the background light BCL2 is brighter than the image light DGL2, the second user U2 can visually recognize the first user U1 via the screen 20, but may have difficulty in visually recognizing the character image of "ABC" displayed on the screen 20, or may be unable to visually recognize it. Note that FIG. 3A is a drawing for explaining a state where the second user U2 cannot visually recognize the character image of "ABC". Further, also in this state, as mentioned above, the first user U1 can visually recognize the display image of the screen 20 and the second user U2.

Figure 3B:
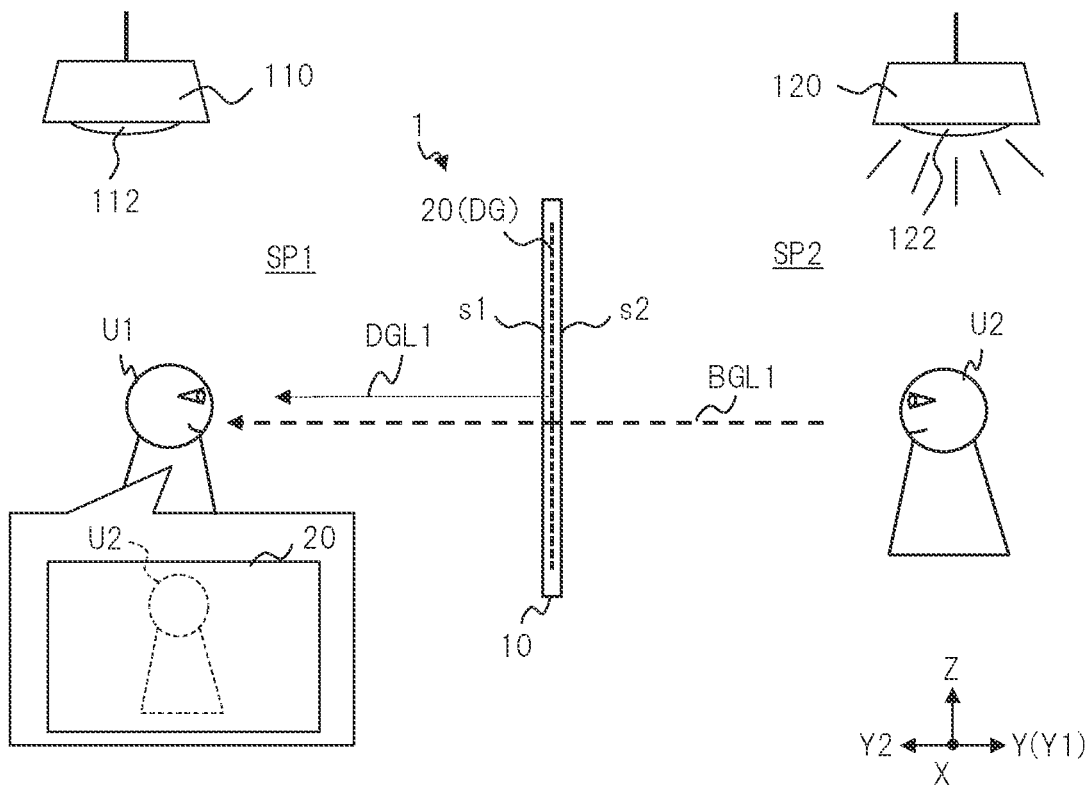
FIG. 3B is a diagram for explaining the basic characteristic of the transparent display apparatus of the first embodiment.

Similarly, for example, as shown in FIG. 3B, it is assumed that a second lightning 20 in the second space SP2 where the second user U2 is present is lighted, and luminance in the second space SP2 is brighter than luminance of the image displayed on the screen 20 of the transparent display 10. In this state, the first user U1 in the first space SP1 can visually recognize the second user U2, but may have difficulty in visually recognizing or may be unable to visually recognize the character image of "ABC" displayed on the screen 20. That is, when the background light BGL1 is brighter than the image light DGL1, the first user U1 can visually recognize the second user U2 via the screen 20, but may have difficulty in visually recognizing the character image of "ABC" displayed on the screen 20, or may be unable to visually recognize it. Note that FIG. 3B is a diagram for explaining a state in which the first user U1 cannot visually recognize the character image of "ABC". Further, even in this state, the second user U2 can visually recognize the display image on the screen 20 and the first user U1 as described above.

As will be described in detail later, the transparent display 1 of the first embodiment uses characteristics in which visible states of the screen 20 by the first user U1 and the second user U2 change depending on states of the first lighting device 110 and the second lighting device 120 as described above. Then, the transparent display 2 of the first embodiment has a feature in which the image displayed on the screen 20 has difficulty in being visually recognized from the second user U2, or cannot be visually recognized therefrom, as necessary, in causing the screen 20 to display the image toward the first user U1.

Hardware Configuration Example of Transparent Display

Figure 6:
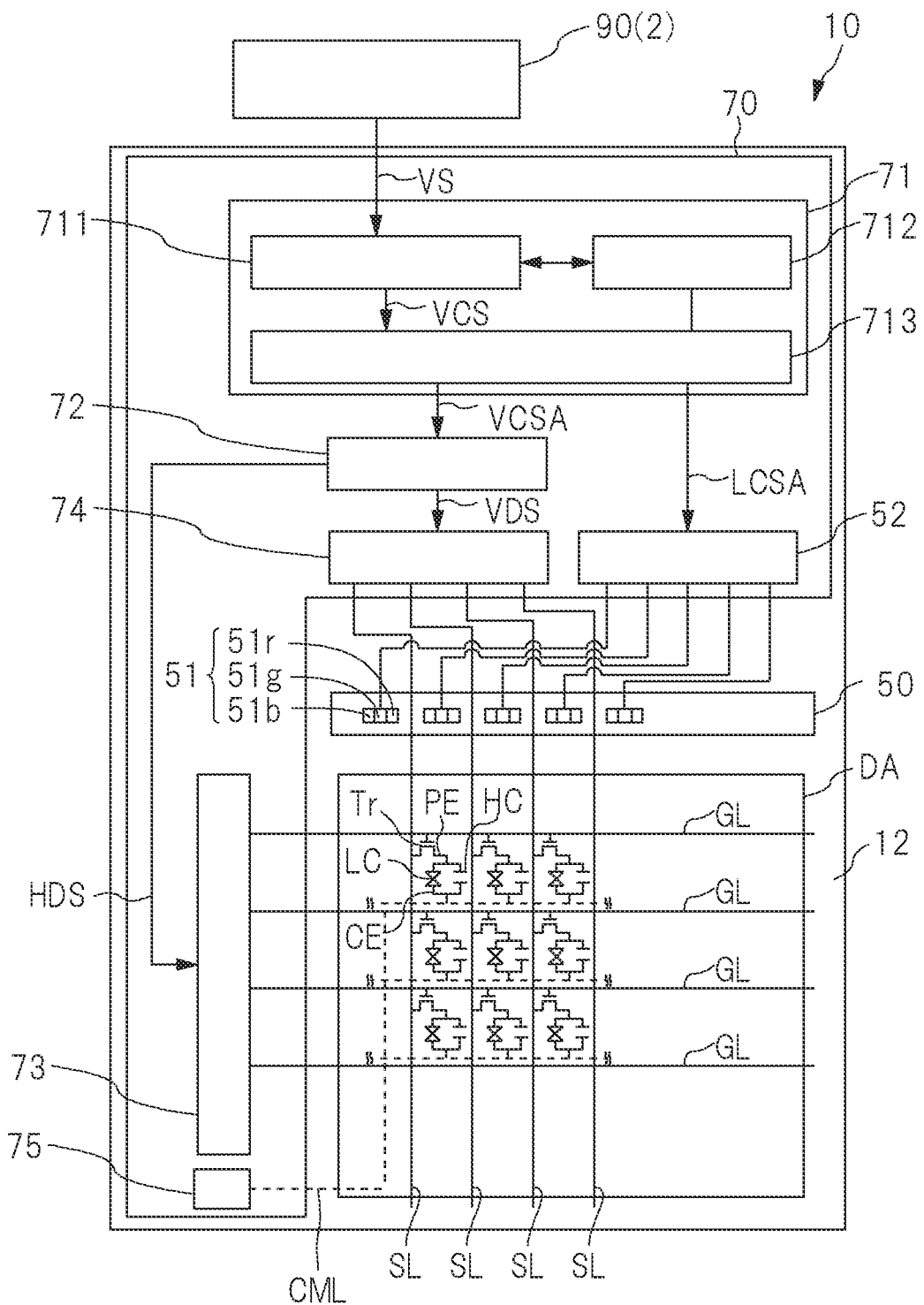
FIG. 6 is a diagram showing a configuration example of circuits in the transparent display apparatus of the first embodiment.

A hardware configuration example of the transparent display 1 according to the first embodiment will be explained by using FIGS. 4 to 6. FIG. 4 is a perspective view showing an outline of a configuration example of the transparent display panel of the transparent display, and is a perspective view of the transparent display panel 10 mainly viewing from the first surface s1. FIG. 5 is a cross-sectional view taken along line A-A in FIG. 4, and schematically shows a path or the like of light emitted from the light source unit of the transparent display. FIG. 6 shows a configuration example of circuits formed in the transparent display.

In FIG. 4, according to the coordinate system of FIG. 1, a direction along a thickness direction of the transparent display panel 10 is defined as a Y direction, and an extension direction of one side of the transparent display panel 10 is defined as a X direction in a X-Z plane orthogonal to the Y direction. A direction intersecting with the X direction is defined as a Z direction. Furthermore, as for the coordinate system (x, y) within the screen 20, a x direction corresponding to the X direction is a lateral direction (in-screen horizontal direction), and a y direction corresponding to the Z direction is a longitudinal direction (in-screen vertical direction). In this example, the screen 20 is a laterally long screen in which a size in the X direction (x direction) is larger than a size in the Z direction (y direction). However, a shape of the screen 20 is not limited to this.

As shown in FIGS. 4 and 5, the transparent display panel 10 includes the above-described first substrate 11, second substrate 12, and display layer 13, and further includes a light source unit 50 and a drive circuit 70. The first substrate 11, display layer 13, and second substrate 12 that configure the transparent display panel 10 are arranged in this order from the first surface s1 side, which is the front surface, in the Y direction.

The first surface s1 of the transparent display panel 10 is provided with a display region DA and a peripheral region PFA corresponding to the screen 20. Note that in this example, the peripheral region PFA becomes also part of the screen 20, but only the display region DA may be the screen 20. The display region DA of the screen 20 is located in a region where the first substrate 11, the second substrate 12, and the display layer 13 overlap as viewed in a plan view in the Y direction. The peripheral region PFA is present outside the display region DA. In FIG. 4, a boundary between the display region DA and the peripheral region PFA is indicated by a dash-double-dot line.

The display region DA is a region where the image is formed according to an input signal supplied from the outside. The display region DA is an effective region where the image is displayed when the first surface s1 or the second surface s2 is viewed in a plan view, for example, in the Y direction. A plurality of pixels PIX are formed in a matrix on the display layer 13 corresponding to the display region DA. The peripheral region PFA is a region including four sides around the display region DA, in other words, a frame region, and no image is displayed.

In this example, the second substrate 12 has a larger width in the X direction than the first substrate 11. The second substrate 12 has a region 40 extended on one side in the X direction. The light source unit 50 and the drive circuit 70 are mounted in the region 40.

In this example, the light source unit 50 is arranged along the peripheral region PFA on a right side with respect to the screen 20, as shown in FIG. 5. The light source unit 50 generates light source light for liquid crystal display on the display layer 13 and supplies it to the display layer 13.

The drive circuit 70 generates electrical signals for driving the first substrate 11, the second substrate 12, the display layer 13, and the light source unit 50, and supplies them to each unit. In FIG. 4, among the circuits included in the transparent display panel 10, a gate line GL and a source line SL, which will be described later and which are part of a signal wiring transmitting a signal for driving liquid crystal corresponding to the pixels PIX, are schematically shown by dash-single-dot lines.

Besides components shown in FIGS. 4 and 5, the transparent display panel 10 may also include, for example, a flexible printed circuit board, a casing, and the like. As the casing, an element(s) for fixing the first substrate 11, display layer 13, and second substrate 12 is recited. This element is omitted in FIGS. 4 and 5. In addition, although the display region DA is a quadrangle in this example, it is not limited to this and may have another shape such as a polygon or a circle. Further, in this example, the light source unit 50 and the drive circuit 70 are mounted on the region 40 of the second substrate 12, but the light source unit 50 and the drive circuit 70 may be mounted on a different substrate from that of the transparent display panel 10. For example, a light source substrate mounting the light source unit 50 and a drive circuit substrate mounting the drive circuit 70 may be attached to the peripheral region PFA of the transparent display panel 10.

An optical path of the light emitted from the light source unit 50, a state of the liquid crystal, or the like will be explained with reference to FIG. 5. The transparent display panel 10 includes the first substrate 11 and the second substrate 12 that are bonded so as to oppose each other via a liquid crystal layer LQL as the display layer 13. The first substrate 11 and the second substrate 12 are arranged in the Y direction, which is the thickness direction of the transparent display panel 10, via the liquid crystal layer LQL. In other words, the first substrate 11 and the second substrate 12 are arranged so as to oppose each other in the Y direction.

The second substrate 12, which is an array substrate, has a front surface 12f opposing the liquid crystal layer LQL and the first substrate 11. The opposite substrate, which is the first substrate 11, has a front surface 12f of the second substrate 12 and a back surface 11b opposing the liquid crystal layer LQL. The liquid crystal layer LQL containing the liquid crystal is located between the front surface 12f of the second substrate 12 and the back surface 11b of the first substrate 11. In other words, the liquid crystal layer LQL is an optical modulation element.

The second substrate 12 is an array substrate in which a plurality of transistors (in other words, transistor elements) as switching elements (in other words, active elements) described later are arranged in an array. The first substrate 11 means a substrate arranged opposite to the second substrate 12, which is an array substrate, and can be referred to as an opposite substrate.

The transparent display panel 10 has a function of modulating the light passing through the liquid crystal of the liquid crystal layer LQL by controlling a state of an electric field formed around the liquid crystal layer LQL via the above switching element. The display region DA is provided in a region overlapping with the liquid crystal layer LQL.

The first substrate 11 and the second substrate 12 are bonded together via a seal portion (in other words, a seal material) SLM. The seal portion SLM is arranged to surround the display region DA. The liquid crystal layer LQL is located inside the seal portion SLM. The seal portion SLM plays a role of sealing the liquid crystal between the first substrate 11 and the second substrate 12 and plays a role as an adhesive for bonding the first substrate 11 and the second substrate 12 together.

The light source unit 50 is arranged at a position of opposing one side surface 11s1 of the first substrate 11. In FIG. 5, the light source light L1, which is the light emitted from the light source unit 50, is schematically shown by dash-double-dot lines. The light source light L1 emitted from the light source unit 50 in the X direction propagates in a direction away from the side surface 11s1, in this example, in the direction X2. In a propagation path of the light source light L1, the back surface 12b of the second substrate 12 and the front surface 11f of the first substrate 11 are interfaces between a medium with large refractive index and a medium with small refractive index. Therefore, when an incident angle in which the light source light L1 is incident on the front surface 11f and the back surface 12b is larger than a critical angle, the light source light L1 is totally reflected on the front surface 11f and the back surface 12b.

The liquid crystal of the liquid crystal layer LQL is a polymer dispersed liquid crystal, and contains a liquid crystal polymer and liquid crystal molecules. The liquid crystalline polymer is formed into stripes, and the liquid crystal molecules are dispersed in the gaps between the liquid crystalline polymers. Each of the liquid crystalline polymer and liquid crystal molecules has optical anisotropy or refractive index anisotropy. Responsiveness of liquid crystalline polymers to electric fields is lower than responsiveness of the liquid crystalline polymers to electric fields. An orientation direction of the liquid crystalline polymer hardly changes regardless of presence or absence of the electric field.

Meanwhile, an orientation direction of the liquid crystal molecules changes depending on the electric field when a high voltage equal to or higher than a threshold is applied to the liquid crystal. When no voltage is applied to the liquid crystal, respective optical axes of the liquid crystalline polymer and the liquid crystal molecules are parallel to each other, and the light source light L1 incident on the liquid crystal layer LQL is hardly scattered in the liquid crystal layer LQL and passes through it. Such a state may be referred to as a transparent state (non-scattering state).

When a voltage is applied to the liquid crystal, the respective optical axes of the liquid crystal polymer and liquid crystal molecules intersect with each other, and the light source light L1 incident on the liquid crystal is scattered in the liquid crystal layer LQL. Such a state may be referred to as a scattering state (in other words, a non-transparent state).

The drive circuit 70 provided in the transparent display panel 10 and the controller 2 as a control circuit connected to the drive circuit 70 control the display state of the screen 20 by controlling an orientation of the liquid crystal in the propagation path of the light source light L1. In the scattering state, the light source light L1 is emitted as the emission light L2 by the liquid crystal to the outside of the transparent display panel 10 from the first surface s1 side, which is the front surface 11*f*, and the second surface s2 side, which is the back surface 12*b*.

Further, the background light L3 incident from the second surface s2 of the transparent display panel 10, which is the back surface 12*b*, passes through the second substrate 12, the liquid crystal layer LQL, and the first substrate 11, and is emitted to the outside from the first surface s1 of the transparent display panel 10, which is the front surface 11*f*. The background light L4 incident from the first surface s1, which is the front surface 11*f*, passes through the first substrate 11, the liquid crystal layer LQL, and the second substrate 12, and is emitted to the other from the second surface s2 of the transparent display panel 10, which is the back surface 12*b*.

As described above, these emission light L2 and background light L3 are visually recognized from the first user U1 on the front side, which is the first surface s1. The emission light L2 corresponds to image light DGL1, and background light L3 corresponds to background light BGL1. The first user U1 can recognize the emission light L2 and the background light L3 in combination. In other words, the first user U1 can recognize a state in which the emission light L2 is superimposed on the background light L3.

As described above, the emission light L2 and the background light L4 are visually recognized from the second user U2 on the second surface s2 side, which is the back surface. The emission light L2 corresponds to image light DGL2, and the background light L4 corresponds to background light BCL2. The second user U2 can recognize the emission light L2 and the background light L4 in combination. In other words, the second user U2 can recognize a state in which the emission light L2 is superimposed on the background light L4.

In the example shown in FIG. 5, in order to ensure visible light transmittance of the first surface s1, which is the front surface, and the second surface s2, which is the back surface, of the transparent display panel 10, the light source unit 50 is arranged at a position that does not overlap the display region DA in a plan view. Further, the transparent display panel 10 reflects the light source light L1 by utilizing a difference in refractive index between the first substrate 11 and second substrate 12, which function as light guide members, and a surrounding air layer. Consequently, in the transparent display panel 10, light can be delivered to the side surface 11*s*2 on an opposite side, which opposes the light source unit 50.

A configuration example of circuits included in the transparent display panel 10 will be described with reference to FIG. 6. FIG. 6 shows a configuration example of the drive circuit 70, the light source unit 50, and the pixels PIX (FIG. 4) in the display region DA.

As shown in FIG. 6, a control unit 90 including the control circuit that controls the image display is connected to the drive circuit 70. This control unit 90 corresponds to the controller 2 in the first embodiment. Note that the control unit 90 (in other words, the controller 2) does not need to be provided as a separate member different from the transparent display panel 10, and may be mounted on the transparent display panel 10 together with the drive circuit 70, for example.

The drive circuit 70 includes a signal processing circuit 71, a pixel control circuit 72, a gate drive circuit 73, a source drive circuit 74, a common potential drive circuit 75, and a light source control unit 52. Further, the light source unit 50 includes, for example, a light emitting diode element 51*r* (for example, red), a light emitting diode element 51*g* (for example, green), and a light emitting diode element 51*b* (for example, blue).

The signal processing circuit 71 includes an input signal analysis unit 711, a storage unit 712, and a signal adjustment unit 713. An input signal VS is inputted to the input signal analysis unit 711 of the signal processing circuit 71 from the control unit 90 via a wiring path such as a flexible printed circuit board (not shown). The input signal analysis unit 711 performs an analysis processing based on the input signal VS inputted from the control unit and generates an input signal VCS. The input signal VCS is, for example, a signal determining what kind of gradation value is given to each pixel PIX (FIG. 3) based on the input signal VS.

The signal adjustment unit 713 generates an input signal VCSA from the input signal VCS inputted from the input signal analysis unit 711. The signal adjustment unit 713 sends the input signal VCSA to the pixel control circuit 72 and sends a light source control signal LCSA to the light source control unit 52. The light source control signal LCSA is, for example, a signal containing information on a light amount of the light source unit 50 that is set according to the gradation value inputted to the pixels PIX.

The pixel control circuit 72 generates a horizontal drive signal HDS and a vertical drive signal VDS based on the input signal VCSA. For example, in this embodiment, the plurality of pixels PIX are driven in a field sequential method. Therefore, in the pixel control circuit 72, the horizontal drive signal HDS and the vertical drive signal VDS are generated for each color that the light source unit 50 can emit.

The gate drive circuit 73 sequentially selects the gate lines GL (in other words, signal wiring) of the transparent display panel within one vertical scanning period based on the horizontal drive signal HDS. The order of the selection of gate lines GL is arbitrary. As shown in FIG. 4, the plurality of gate lines GL extend in the X direction (x direction) and are arranged along the Z direction (y direction).

The source drive circuit 74 supplies a gradation signal corresponding to an output gradation value of each pixel PIX to each source line SL (in other words, signal wiring) of the transparent display panel within one horizontal scanning period based on the vertical drive signal VDS. As shown in FIG. 3, the plurality of source lines SL extend in the Z direction (y direction) and are arranged along the X direction (x direction). One pixel PIX is formed at each intersection between the gate lines GL and the source lines SL.

The switching element Tr is formed at each portion in which the gate lines GL and source lines SL are intersected with each other. The plurality of gate lines GL and the plurality of source lines SL correspond to a plurality of signal wirings that transmit drive signals for driving the liquid crystal of the liquid crystal layer LQL in FIG. 5.

For example, a thin film transistor is used as the switching element Tr. The type of thin film transistor is not particularly limited. One of the source electrode and the drain electrode of the switching element Tr is connected to the source line SL, the gate electrode is connected to the gate line GL, and the other of the source electrode and drain electrode is connected to one end of the capacitor of a polymer dispersed liquid crystal LC (corresponding to the liquid crystal layer (corresponding to the liquid crystal of the liquid crystal layer LQL of FIG. 5). The one end of the capacitor of the polymer dispersed liquid crystal LC is connected to the switching element Tr via a pixel electrode PE, and the other end is connected to a common potential wiring CML via a common electrode CE. Further, retention capacity HC is generated between the pixel electrode PE and a retention capacity electrode electrically connected to the common potential wiring CML. The common potential wiring CML is supplied by the common potential drive circuit 75. The wiring path connected to the common electrode CE in FIG. 6 is formed, for example, on the first substrate 11 in FIG. 4. In FIG. 6, the wirings formed on the first substrate 11 are illustrated by dotted lines.

In the configuration example shown in FIG. 6, the light source control unit 52 is included in the drive circuit 70. As a modification example, the light source control unit 52 may be provided separately from the drive circuit 70. As described above, when the light source unit 50 is mounted on a light source substrate different from the second substrate 12, the light source control unit 52 may be formed on the different light source substrate, or may be formed on an electronic component(s) mounted on the different light source substrate.

Controller

Figure 7:
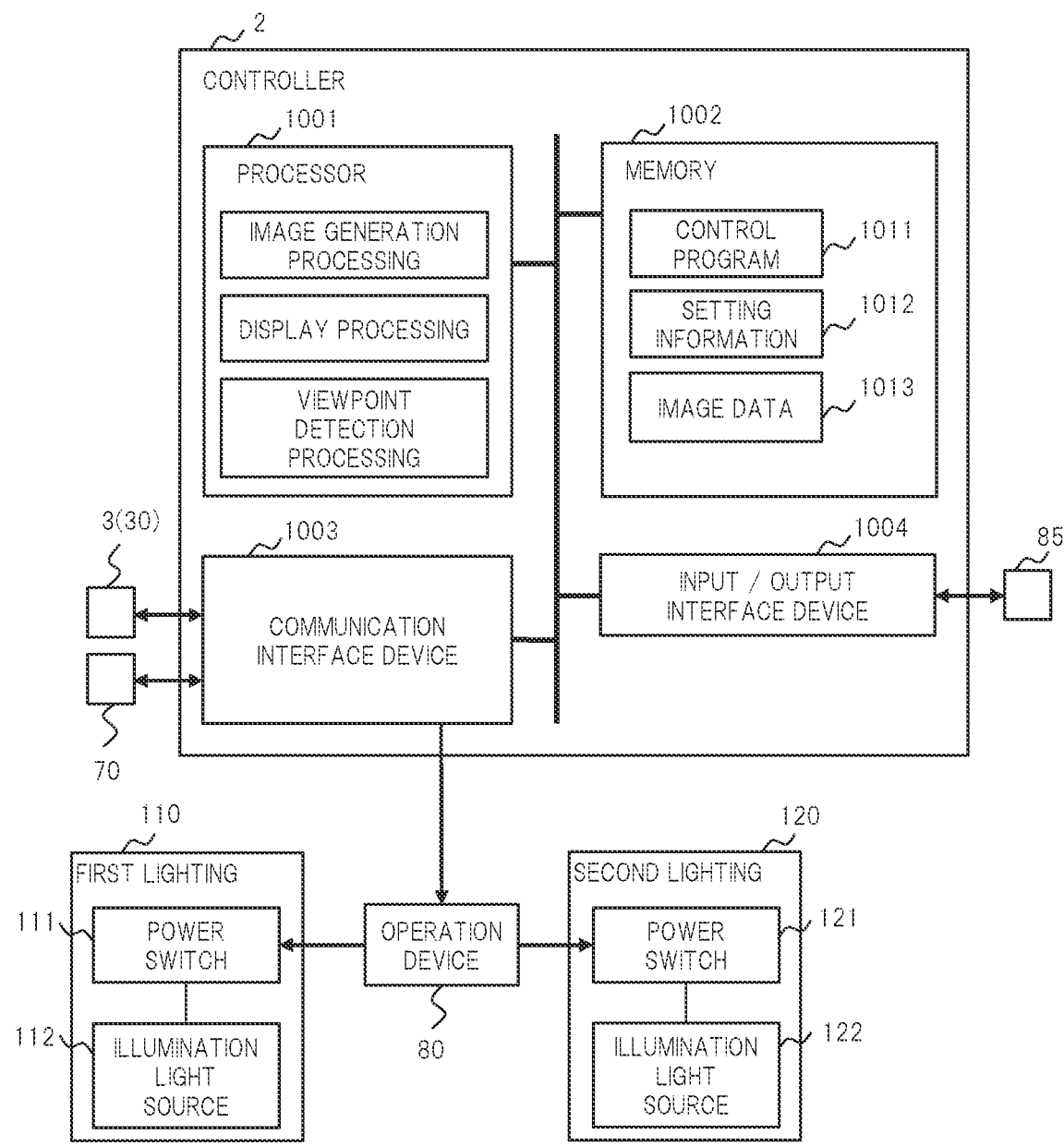
FIG. 7 is a diagram showing a configuration example of a controller in the transparent display apparatus of the first embodiment.

FIG. 7 is a functional block diagram showing a configuration example of the controller 2, which is a control device. As shown in FIG. 7, the controller 2 includes a processor 1001, a memory 1002, a communication interface device 1003, an input/output interface device 1004, and the like, which are interconnected via a bus(es) or the like. The processor 1001 executes a processing according to a control program 1011. Consequently, predetermined functions, processing units, and the like are realized. As functions and the processing units implemented by the processor 1001, there are an image generation processing, a display processing, and the like.

Furthermore, as described above, the controller 2 also functions as part of the eye tracking device 3. That is, as one of the functions and the processing units realized by the processor 1001, there are a viewpoint detection processing (in other words, eye tracking processing) for detecting the viewpoint of the first user U1 and the like.

The memory 1002 stores a control program 1011, setting information 1012, image data 1013, and other data and information related to a processing(s). The control program 1011 is a computer program that implements the functions and the like. The setting information 1012 is system setting information and user setting information. The image data 1013 is data for displaying images and video images on the screen 20. The communication interface device 1003 is connected to the drive circuit 70 of the transparent display panel 10, a first camera 30 configurating the eye tracking device 3, and other external devices, and the like, and performs a communication processing(s) by using a predetermined communication interface. An input device(s) and an output device(s) can be connected to the input/output interface device 1004.

The communication interface device 1003 is connected to the eye tracking device 3, the drive circuit 70 of the transparent display panel 10, an external device(s), and the like, and performs the communication processing by using a predetermined communication interface. In this way, the devices such as the eye tracking device 3 and the drive circuit 70 are connected to the controller 2 via wireless communication. However, the devices such as the eye tracking device 3 and the drive circuit 70 may be connected to the controller 2 via a cable(s).

The communication interface device 1003 is further connected to an operation device 80 for operating a power switch 111 of the first lighting 110 that illuminates the first space SP1 and a power switch 121 of the second lighting 120 that illuminates the second space SP2. That is, the operation device 80 is connected to the controller 2 via the wireless communication, and the controller 2 controls switching for turning on/off the power switch 111 of the first lighting 110 and the power switch 121 of the second lighting 120 via the operation device 80. A configuration of this operation device 80 is not particularly limited. For example, the operation device 80 may be incorporated into circuits of the first lighting 110 and the second lighting 120 to electrically operate the power switches 111 and 121, or may be configured to physically operate the power switches 111 and 121.

Note that in this example, the operation device 80 operates the power switch 111 of the first lighting 110 and the power switch 121 of the second lighting 120, but the configuration of the operation device 80 is not limited to this. The operation device 80 may operate one of the power switch 111 of the first lighting 110 or the power switch 121 of the second lighting 120, as necessary.

For example, an input device 85 for inputting requests and instructions from the first user U1 is connected to the input/output interface device 1004 via the cable or the like. In other words, the input device 85 is a device for receiving operations from the first user U1, and is connected to the controller 2 by wire. As the input device 85, for example, a keyboard, buttons, touch screen, and the like are recited. The input/output interface device 1004 transmits the signal sent from the input device 85 to the processor 1001. Further, various output devices to which the signals from the controller 2 are outputted may be connected to the input/output interface device 1004. Note that the input device 85 and various output devices may be connected to the controller 2 via the wireless communication.

Use of Transparent Display as Communication Tool

The transparent display 1 can be used as a communication tool between the first user U1 and the second user U2. For example, the transparent display panel 10 of the transparent display 1 is arranged between the first user U1 and the second user U2, and while showing the image displayed on the screen 20 to the second user U2, the first user U1 can see a face of the user U2 and have a conversation with the second user. However, even if the image displayed on the screen 20 includes contents that the first user U1 does not want the second user U2 to see, the image will be seen by the second user U2.

Therefore, in the first embodiment, when the controller 2 of the transparent display 1 causes the screen 20 to display the image toward the first user U1 who is the main user, for example, it controls, based on the operation of the first user U1, the state of the first lighting 110 that lights an inside of the first space SP1. More specifically, the controller 2 controls the state of the first lighting 110 so that luminance near the transparent display panel 10 in the first space SP1 is brighter than luminance of the image displayed on the transparent display panel 10. As one example, the controller 2 controls the switching for turning on/off the power switch 111 of the first lighting 110.

Consequently, as described with reference to FIG. 3, the image displayed on the screen 20 of the transparent display panel 10 can be made a state of being substantially able to be visually recognized only from the first user U1. That is, the image displayed on the screen 20 has difficulty in visually recognized from the second user U2, or can be made a state of being unable to be visually recognized therefrom. In this way, the transparent display 1 of the first embodiment controls the state of the first lighting 110 so that the image displayed on the screen 20 of the transparent display panel 10 becomes the state of being substantially able to be visually recognized only from the first user U1 in causing the screen 20 to display the image toward the user U1.

In the first embodiment, the controller 2 controls a state of the first lighting 110 for switching it between a first state of turning off an illumination light source 112 of the first lighting 110 and a second state of turning on the illumination light source 112 based on an operation of the first user U1. For example, in displaying the image on the screen 20 based on the operation of the first user U1, if the first user U1 performs an operation of requesting to hide the image with respect to the second user U2, the controller 2 controls the switching of the state of the first lighting 110 from the first state to the second state.

Here, when the state of the first lighting 110 is the second state, the luminance near the transparent display panel 10 in the first space SP1 gets enough lighter than the luminance of the image displayed on the screen 20 of the transparent display panel 10. In other words, the first lighting 110 includes, as the illumination light source 112, having the light amount (in other words, light flux) that can ensure the luminance in the first space SP1 as described above.

Therefore, by switching the state of the first lighting 110 from the first state to the second state, the state of the first lighting 110 becomes such a state that the image displayed on the screen 20 has difficulty in being visually recognized from the second user U2, or cannot be visually recognize therefrom (in other words, it can be substantially visually recognized only from the first user U1). Note that the types of the illumination light source 112 of the first illumination device 110 and the illumination light source 122 of the second illumination device 120 are not particularly limited as long as they have the above-mentioned light amount.

In this way, the transparent display 1 controls the state of the first lighting 110 in conjunction with the transparent display panel 10. Consequently, the image displayed on the screen 20 of the transparent display panel 10 becomes the state of being able to substantially visually recognized only from the first user U1. Therefore, when the first user U1 who is the main user has a conversation or the like with the second user U2 via the transparent display 1, the first user U1 can cause the transparent display panel to display various images without worrying about a situation(s).

For example, the first user U1 can cause the transparent display panel 10 to display an image containing information that the second user U2 does not want to see. Furthermore, also regarding the image and the like that it is all right for the second user U2 to see but is likely to become noise for the second user U2, the first user U1 remains causing the panel to display the image without performing any operation to hide it. Furthermore, by making the image displayed on the screen 20 invisible to the second user U2, the transparent display 1 can also be used as a so-called prompter. As described above, the technique of the present invention can improve the convenience of the transparent display 1 and expand the range of use of the transparent display 1.

Figure 8:
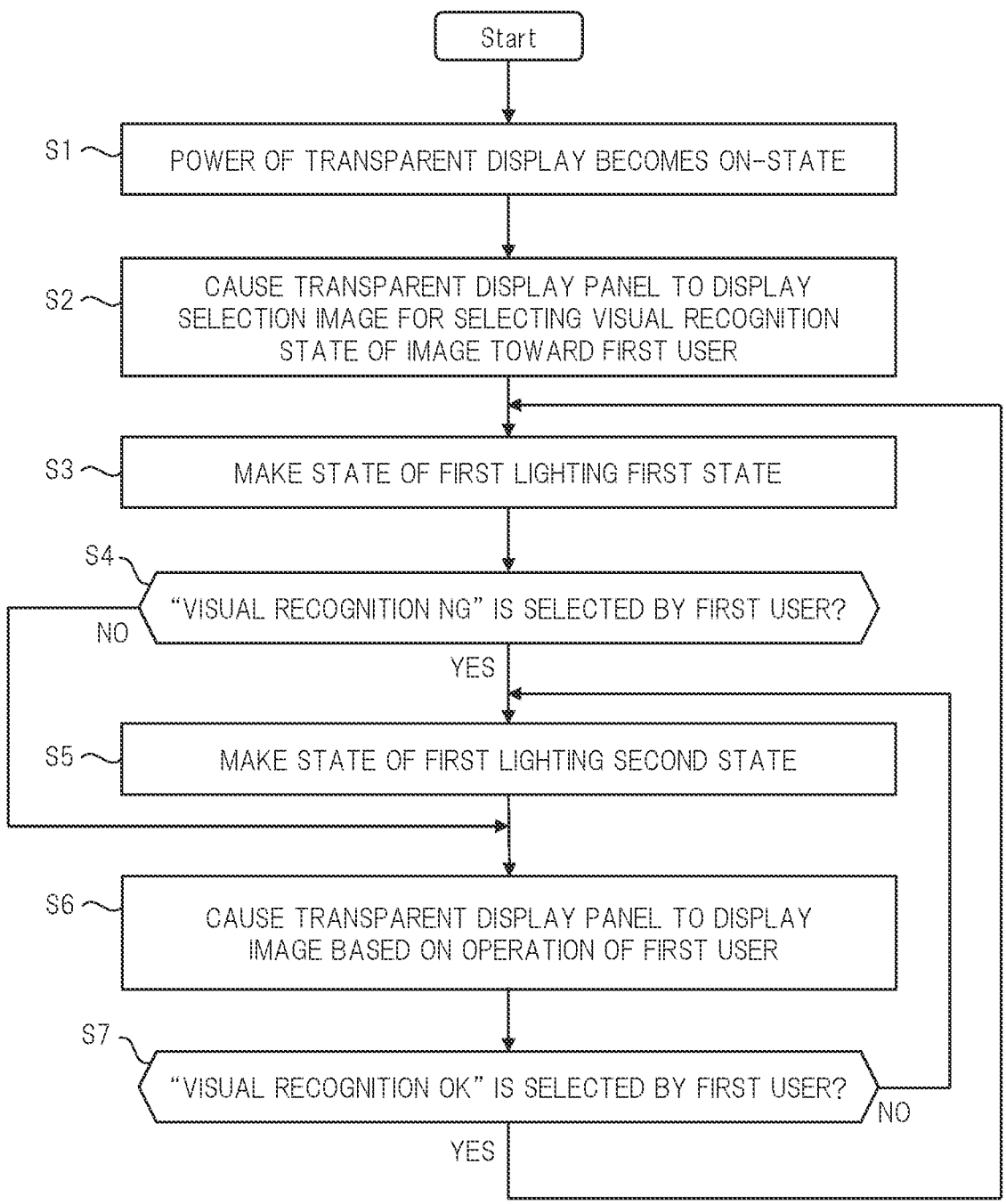
FIG. 8 is a diagram showing a flow of an image display processing in the transparent display apparatus of the first embodiment.
Figure 9:
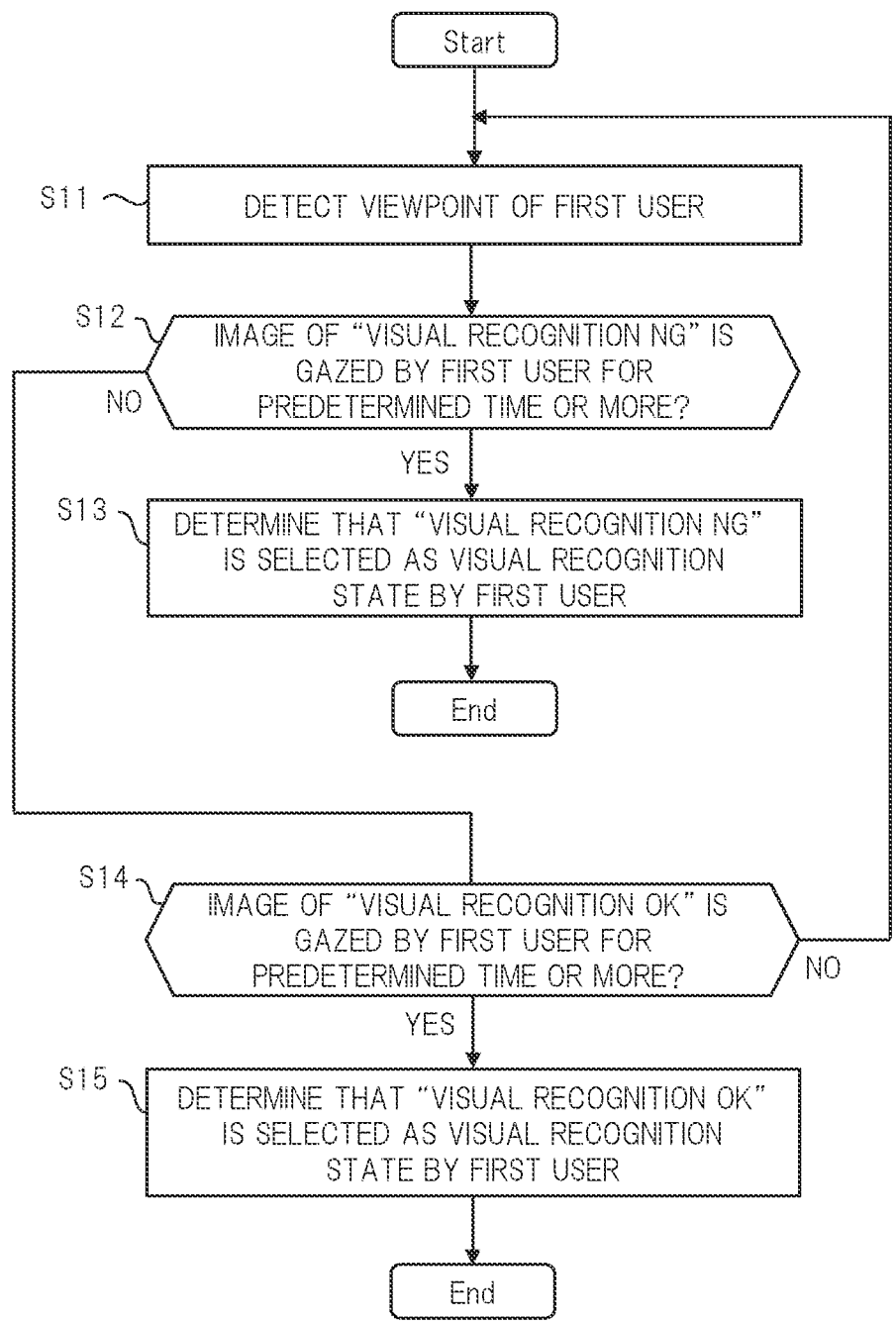
FIG. 9 is a diagram showing a flow of a selection determination processing in in the transparent display apparatus of the first embodiment.
Figure 10:
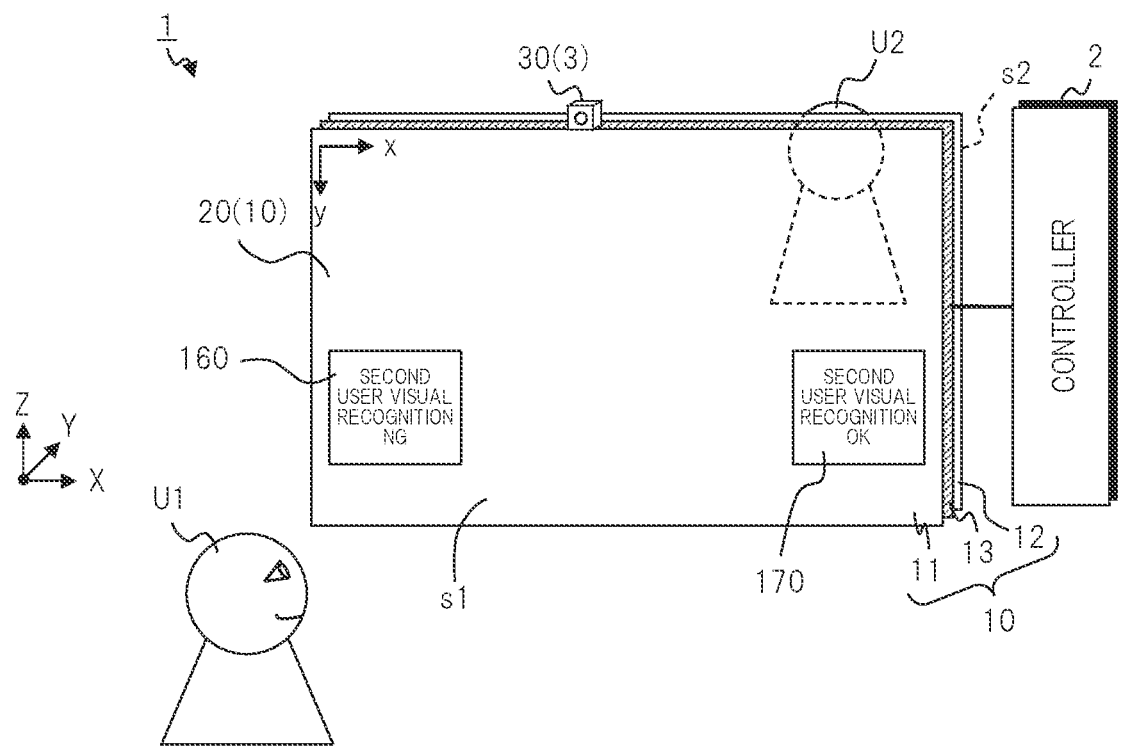
FIG. 10 is a diagram showing a screen display example in the transparent display apparatus of the first embodiment.
Figure 11:
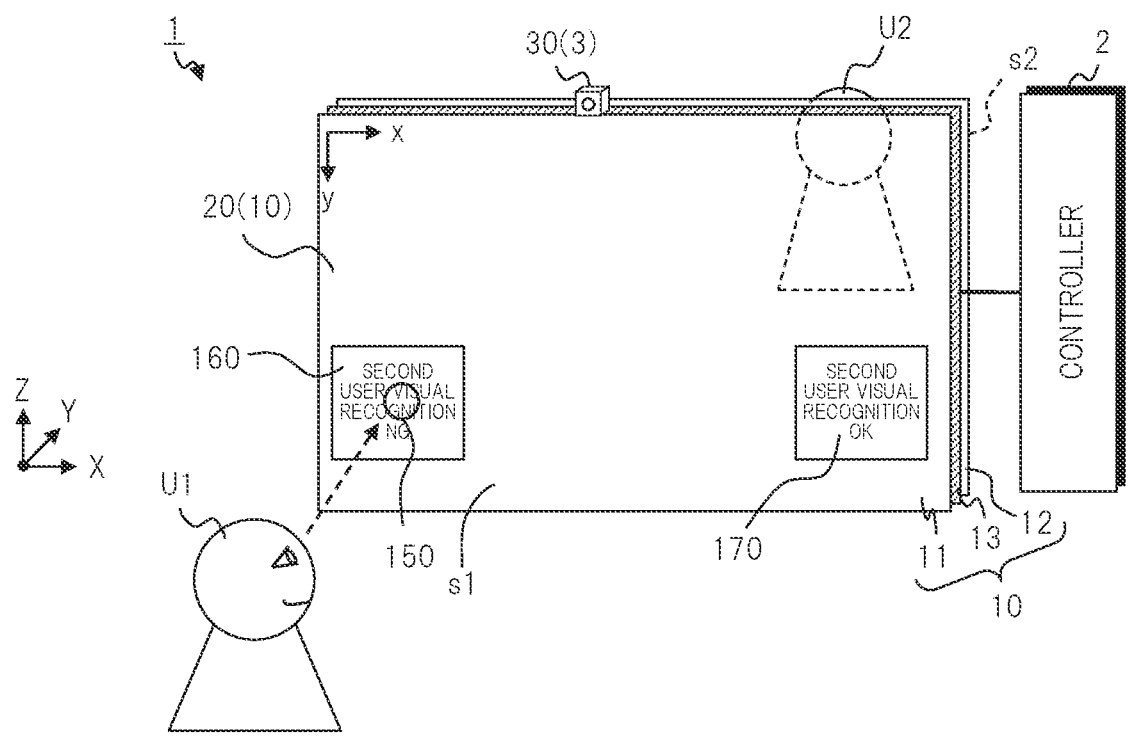
FIG. 11 is a diagram showing a screen display example in the transparent display apparatus of the first embodiment.
Figure 12:
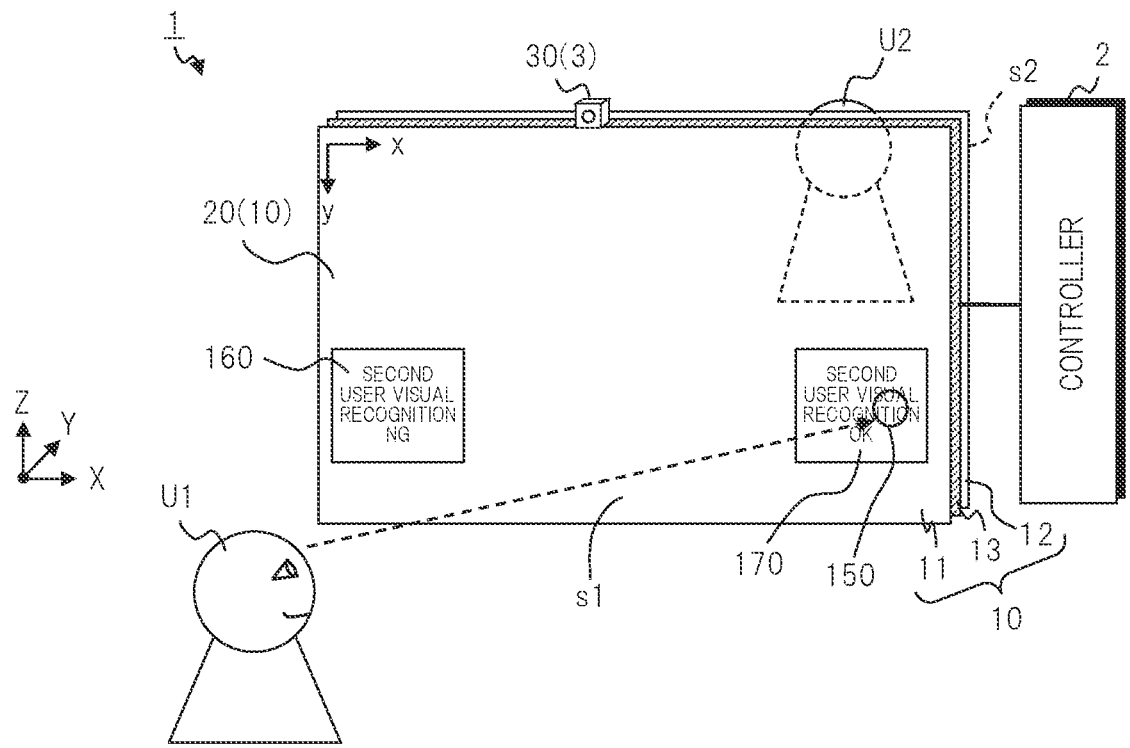
FIG. 12 is a diagram showing a screen display example in the transparent display apparatus of the first embodiment.

Hereinafter, one example of an image display processing of the transparent display 1 of the first embodiment will be further described with reference to FIGS. 8 to 12. FIG. 8 is a flowchart showing one example of an image display processing in the transparent display of the first embodiment. FIG. 9 is a flowchart showing one example of a selection determination processing of a visual recognition state in the transparent display according to the first embodiment. Further, FIGS. 10 to 12 are diagrams each showing one example of the screen of the transparent display panel. Note that various processings on the transparent display 1 described below are executed by the controller 2 as described above.

As shown in the flowchart of FIG. 8, when the power of the transparent display 1 is turned on in step S1, the transparent display 1 causes the screen 20 of the transparent display panel 10 to display a selection image for selecting a visual recognition state of the image displayed on the screen 20 (step S2). In the first embodiment, as shown in FIG. 10, as the above selection image, an image 160 of "Second User visual recognition NG" and an image 170 of "Second User visual recognition OK" are displayed toward the first user who is the main user.

The state of "second User visual recognition NG" (hereinafter simply referred to as "visual recognition NG") is a state in which the second user U2 has difficulty in visually recognize the image displayed on the screen 20 or cannot visually recognize it. In other words, the state of the "visual recognition NG" is a state in which substantially only the first user U1 can visually recognize the image on the screen 20. Meanwhile, the state of "Second User visual recognition OK" (hereinafter simply referred to as "visual recognition OK") is a state in which the second user U2 can visually recognize the image displayed on the screen 20. In other words, the "visual recognition OK" state is a state in which each of the first user U1 and the second user U2 can visually recognize the image displayed on the screen 20.

As described above, in the transparent display 1 of the first embodiment, the first user U1 who is the main user can appropriately select between the state of the "visual recognition NG" and the state of the "visual recognition OK" as the visual recognition state of the image. Then, in causing then image on the screen 20 to display the image toward the first user U1, if the first user U1 selects the "visual recognition NG", the image is displayed on the screen 20 so as to be able to substantially visually recognized only from the first user U1. Meanwhile, if the first user U1 selects the "visual recognition OK", the image is displayed on the screen 20 so as to be able to visually recognized from each of the first user U1 and the second user U2.

In this example, when the power of the transparent display 1 is turned on, the visual recognition state always becomes a state of selecting the "visual recognition OK". Consequently, in step S3, the transparent display 1 controls the first lighting 110 lighting the first space SP1 where the first user U1 is present so as to become the first state. That is, if the first lighting 110 is in the second state during the power on, the transparent display 1 switches to the first state and if the first lighting 110 is in the second state, the transparent display maintains the first state.

Of course, when the power of the transparent display 1 is turned on, the visual recognition state may always become the state of selecting the "visual recognition OK". In that case, it is preferable in step S3 that the transparent display 1 makes the first lighting 110 lighting the first space SP1, in which the first user U1 is present, the second state. That is, when the power of the transparent display 1 is turned on, it is preferably that the first lighting 110 is switched to the second state if being in the first state, and maintains the second state if being in the second state.

Next, it is determined whether the "visual recognition NG" or "visual recognition OK" is selected as the visual recognition state by the first user U1 (step S4). A method of selecting the visual recognition state by the first user U1 is not particularly limited, but as one example, the first user U1 can select either the "visual recognition NG" or "visual recognition OK" by the visual line.

For example, as shown in FIG. 9, in step S11, the eye tracking device 3 included in the transparent display 1 detects the viewpoint of the first user U1 based on, for example, the image and the like of the first user U1 photographed by the camera 30. That is, the eye tracking device 3 detects a destination on the screen 20 where the visual line of the first user U1 is directed (in other words, a gaze point). When the viewpoint of the first user U1 on the screen 20 is detected, as shown in FIG. 11, a cursor 150 (as one example, indicated by a circle in the figure) indicating the viewpoint of the first user U1 is displayed on the screen 20 of the transparent display panel 10 based on detection information by the eye tracking device 3. This cursor 150 moves within the screen 20 according to movement of the viewpoint of the first user U1.

The process proceeds to step S12, the transparent display 1 determines whether which of the image 160 of the "visual recognition N" or the image 170 of the "v visual recognition OK" the first user U1 gazes at from the viewpoint of the first user U1 detected by the eye tracking device 3. That is, the transparent display 1 determines whether the first user U1 is going to select the image 160 of "visual recognition NG" or the image 170 of the "visual recognition OK".

The transparent display 1 is whether when the viewpoint of the first user U1 remains on one of the image 160 of the "visual recognition NG" or the image 170 of the "visual recognition OK" for a predetermined period of time (for example, about several seconds) or more, the first user U1 is gazing at the image 160 of the "visual recognition NG" or the image 170 of the "visual recognition OK". In this example, first, in step S12, it is determined whether the first user U1 is gazing at the image 160 of "visual recognition NG". That is, it is determined whether the viewpoint of the first user U1 remains on or near the image 160 of the "visual recognition NG" for the predetermined period of time or more. If the viewpoint of the first user U1 remains near the image 160 of the "visual recognition NG" for a predetermined period of time or more (step S12: YES), the transparent display 1 determines that the "visual recognition NG" as the visual recognition state is selected by the first user U1 (step S13).

For example, as shown in FIG. 11, when the cursor 150 overlaps the image 160 of the "visual recognition NG" and an overlapping time exceeds the predetermined time or more (step S12: YES), the transparent display 1 determines that the image 160 of the "visual recognition NG" is gazed at by the first user U1 (step S13). Then, the transparent display 1 determines that the "visual recognition NG" has been selected by the first user U1 as the visual recognition state of the image displayed on the screen 20, and ends a visual recognition state selection processing. Meanwhile, if the first user U1 is not gazing at the image 160 of the "visual recognition NG" (step S12: NO), the process proceeds to step S14.

In step S14, it is determined whether the first user U1 is gazing at the image 170 of the "visual recognition OK". That is, it is determined whether the viewpoint of the first user U1 remains on or near the image 170 of the "visual recognition OK" image 170 for the predetermined time or more. If the viewpoint of the first user U1 remains in the vicinity of the image 170 for the predetermined time or more (step S14: YES), the transparent display 1 is determines that that the "visual recognition OK" is selected as the visual recognition state by the first user U1 (step S15).

For example, as shown in FIG. 12, when the cursor 150 overlaps the image 170 of the "visual recognition OK" and the overlapping time is longer than the predetermined time (step S14: YES), the transparent display 1 determines that the first user is gazing at the image 170 of the "visual recognition OK" (step S15). That is, the transparent display 1 determines that the "visual recognition OK" has been selected by the first user U1 as the visual recognition state of the image displayed on the screen 20 (step S15), and ends the selection determination processing of the visual recognition state. Meanwhile, if the image of the "visual recognition OK" is not being gazed at by the first user U1 (step S14: NO), the process returns to step S11 and continues the above-described selection determination processing.

Note that a method of selecting the visual recognition state by the first user U1 is not particularly limited, and for example, the first user U1 may make a selection by operating the input device 85 such as a keyboard or a switch.

Returning to the flowchart of FIG. 8, in step S4, it is determined whether the first user U1 has selected the "visual recognition NG" or "visual recognition OK as the visual recognition state. As one example, it is determined whether the visual recognition state selected by the first user U1 is the "visual recognition NG". Here, if the first user U1 selects the "visual recognition NG" from the state of "visual recognition OK" (step S4: YES), the process proceeds to step S5. Further, even if the "visual recognition OK" is not selected in the state of the "visual recognition NG" (step S4: YES), the process similarly proceeds to step S5.

Meanwhile, if the first user U1 selects the "visual recognition OK" from the state of the "visual recognition NG" (Step S4: NO), the process proceeds to Step S6. Further, even if the first user does not select the "visual recognition NG" in the state of the "visual recognition OK" (step S4: NO), the process similarly proceeds to step S6.

In step S5, the transparent display 1 controls the state of the first lighting 110 so as to be in the second state (step S5). The transparent display 1 controls the first lighting 110 so as to switch to the second state if being in the first state and to maintain the second state if being in the second state. For example, when the first lighting 110 is in the first state, the transparent display 1 uses the operation device 80 to switch the power switch 111 of the first lighting 110 from off to on, and lights up the illumination light source 112.

Next, when the first user U1 requests to cause the screen 20 to display the image by operating the input device 85 or the like, the transparent display 1 causes the screen 20 to display the predetermined image (step S6). In this case, since the illumination light source 112 of the first lighting 110 is lit, the image displayed on the screen 20 becomes such a state as to be able to be visually recognized from the first user U1, but have difficulty in being recognized from the second user U2 or be unable to be visually recognized from the second user U2 (See FIG. 3).

Meanwhile, in step S4, if the first user U1 selects the "visual recognition OK", in other words, if the first user U1 does not select the "visual recognition NG" (Step S4: NO), the process proceeds to step S6 without changing the state of first lighting 110. In step S6, the predetermined image is displayed on the screen 20 based on the input operation by the first user U1 as described above. However, in this case, since the illumination light source 112 of the first lighting 110 is off, the image displayed on the screen 20 becomes the state of being able to be visually recognized by each of the first user U1 and the second user U2 (see FIG. 2).

Thereafter, it is determined which "visual recognition NG" or "visual recognition OK" is selected as the visual recognition state by the first user U1 (step S7). As one example, in step S7, it is determined whether the "visual recognition OK" is selected as the visual recognition state by the first user U1.

Here, if the first user U1 selects the "visual recognition OK" from the state of the "visual recognition NG" (Step S7: YES), the process returns to Step S3 and the transparent display 1 Control the state of the first lighting 10 so as to switch from the second state to the first state. Also, if the "visual recognition NG" is not selected in the state of the "visual recognition OK" (step S7: YES), the process similarly returns to step S3 and the transparent display 1 controls the state of the first lighting 110 so as to maintain the first state.

Meanwhile, if the first user U1 does not select the "visual recognition OK" in the state of the "visual recognition NG" (Step S7: NO), the process returns to Step S5 and the transparent display 1 controls the state of the first lighting 110 so as to maintain the second state. Also, if the first user U1 selects the "visual recognition NG" in the state of the "visual recognition OK" (Step S7: NO), the process similarly returns to Step S5 and the transparent display 1 controls the state of the first lighting 110 so as to switch from the first state to the second state.

As described above, according to the first embodiment, for example, based on the operation of the first user U1, the image displayed on the screen 20 toward the first user U1 is temporarily and substantially can be made the visual recognition state only from the user U1. Consequently, the first user U1 can display, on the transparent display panel 10, an image including information that the second user U2 does not want to see, and the convenience of the transparent display 1 is improved. Further, since the image displayed on the screen 20 cannot be visually recognized from the second user U2, a new way of using the transparent display 1 becomes possible. For example, the transparent display 1 can be used as the so-called prompter, and the range of uses of the transparent display 1 is extended. As described above, according to the present invention, it is possible to provide a technique being capable of expanding use application of the transparent display apparatus that is the transparent display 1.

Modification Example of First Embodiment

In the first embodiment, the state of the first lighting 110 is controlled in causing the screen 20 to display the image based on the operation of the first user U1, but timing of controlling the state of the first lighting 110 is merely one example and is not limited thereto. The transparent display 1 may control the state of the first lighting 110 in causing the screen 20 to display the image 20 toward the first user U1.

Furthermore, in the first embodiment, described has been the example in which the state of the first lighting 110 is controlled based on the operation of the first user U1, but the state of the second lighting 120 can also be controlled as appropriate. For example, when the power is turned on, the transparent display 1 may control the second lighting 120 so as to switch the first state if being the second state and maintains the first state if being in the first state. This makes it possible to make the image displayed on the screen 20 from the first user U1 more visible.

Further, in the first embodiment, described has been the example in which the first user U1 in the first space SP1 is the main user of the transparent display 1, but of course, the second user U2 in the second space SP2 may be the main user. However, in this case, the camera 30 that configures the eye tracking device 3 requires to be arranged toward the second user U2.

Second Embodiment

Figure 13:
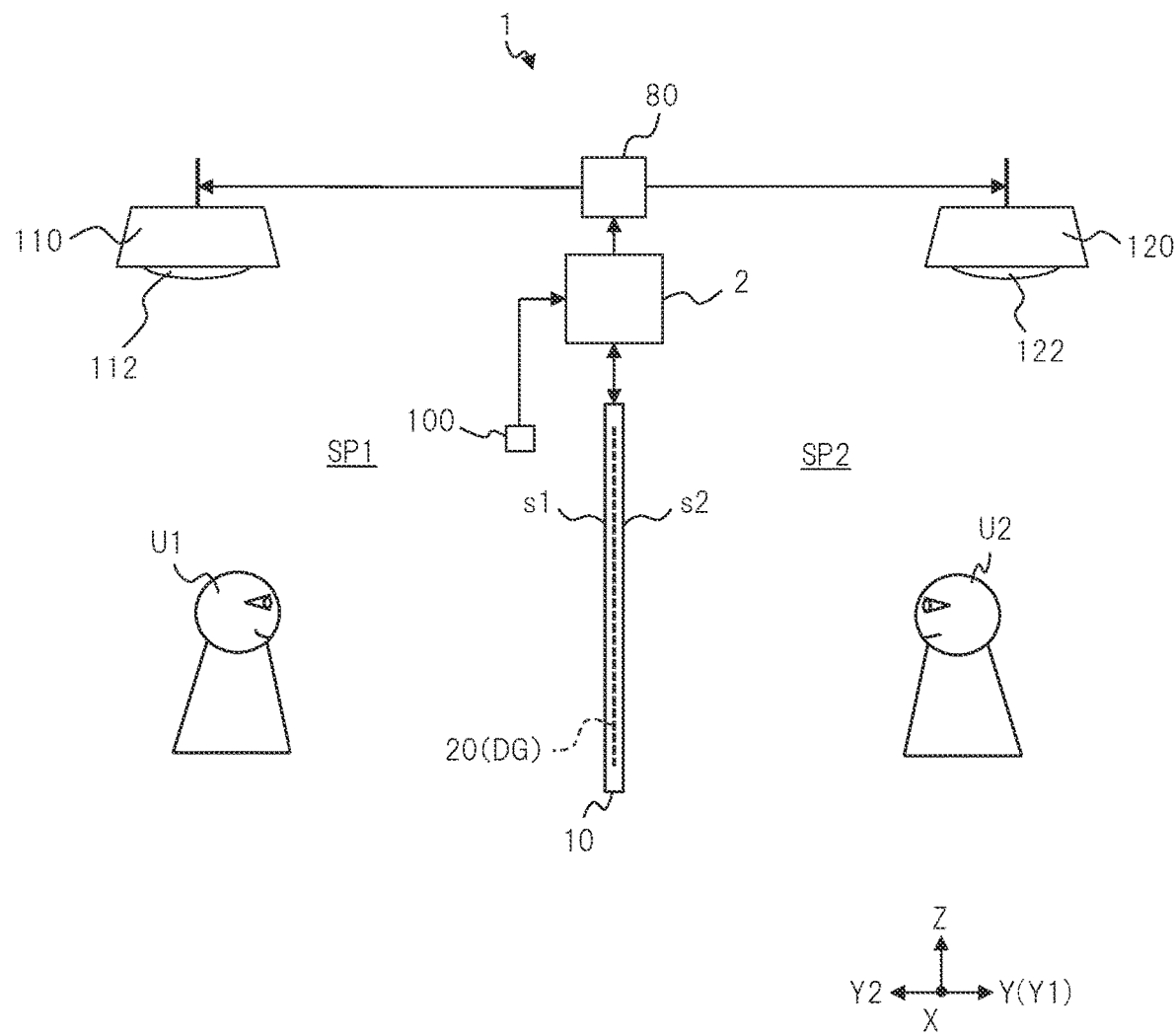
FIG. 13 is a diagram showing a configuration of a transparent display apparatus according to a second embodiment.
Figure 14:
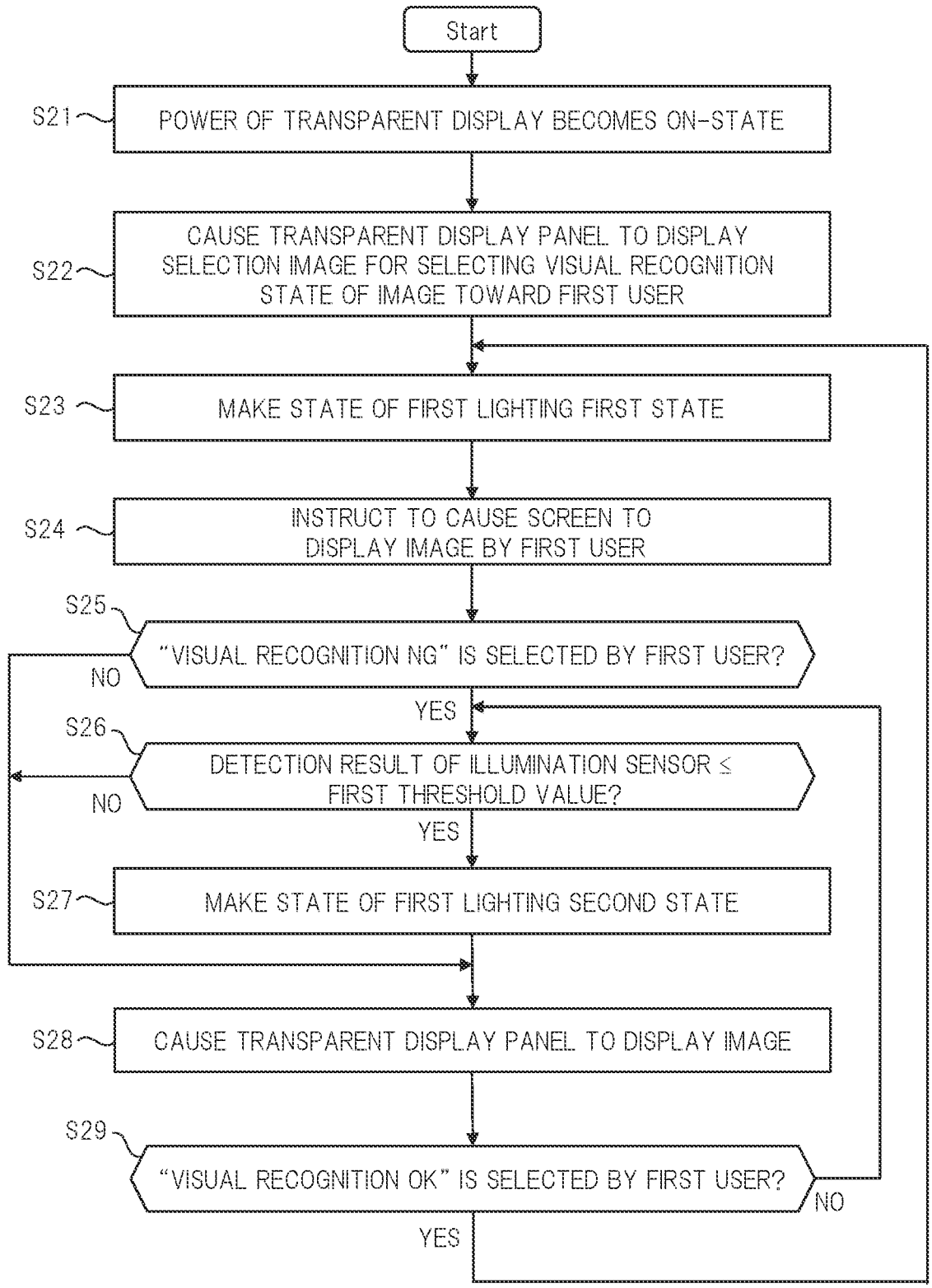
FIG. 14 is a diagram showing a flow of an image display processing in the transparent display apparatus of the second embodiment.

FIG. 13 is a diagram showing a schematic configuration of a transparent display according to a second embodiment. FIG. 14 is a flowchart showing one example of an image display processing in the transparent display according to the second embodiment. The transparent display of the second embodiment will be described by using FIGS. 13 and 14. A basic configuration of the transparent display of the second embodiment is the same as and common to the first embodiment, and below, components of the transparent display of the second embodiment, which are different from those of the first embodiment, will be mainly explained.

As shown in FIG. 13, in addition to the configuration of the first embodiment, the transparent display 1 of the second embodiment further includes an illuminance sensor 100 that detects illuminance of the first space SP1. This illuminance sensor 100 is preferably provided near the transparent display panel 10 in the first space SP1. However, arrangement of the illuminance sensor 100 is not particularly limited. The illuminance sensor 100 has only to be arranged within the first space SP1 so as to be able to detect the illuminance within the first space SP1. Furthermore, in the second embodiment, the first lighting 110 and the second lighting 120 are capable of adjusting the light amount in multiple stages.

Then, the transparent display 1 of the second embodiment controls the state of the first lighting 110 based on a detection result of the illuminance sensor 100 in performing the image display processing. In other words, the transparent display 1 controls the state of the first lighting 110 based on the illuminance near the transparent display panel 10 in the first space SP1 that is measured by the illuminance sensor 100.

For example, as shown in the flowchart of FIG. 14, when the power of the transparent display 1 is turned on in step S21, the transparent display 1 causes the screen 20 of the transparent panel 1 to display the selection image (see FIG. 10) for selecting the visual recognition state of the image (step S22). Next, the transparent display 1 controls the first lighting 110 so as to be made the first state (step S23). In step S23, the transparent display 1 also controls the state of the second lighting 120 lighting the second space SP2, in which the second user U2 is present, so as to be in the first state. Note that steps S21 to S23 are the same steps as steps S1 to S4 in the first embodiment.

Next, when the first user U1 issues an instruction to cause the screen 20 to display the image in step S24, the transparent display 1 determines which of the "visual recognition NG" or "visual recognition OK" as the visual recognition state is selected by the first user U1 (Step S25). Step S25 corresponds to step S4 of the first embodiment, and it is determined whether the "visual recognition NG" is selected as the visual recognition state by the first user U1. If the "visual recognition NG" is selected as the visual recognition state by the first user U1 (step S25: YES), the process advances to step S26. Note that a determination method in step S25 is not particularly limited, but for example, similarly to the first embodiment, the determination is made based on the viewpoint of the first user U1.

In step S26, the transparent display 1 determines the luminance of the first space SP1 based on the detection result of the illuminance sensor 100. More specifically, the transparent display 1 determines whether the luminance near the transparent display panel 10 in the first space SP1 is darker than the luminance of the image displayed on the screen 20. As one example, the transparent display 1 determines whether the detection result of the illuminance sensor 100 is a preset first threshold value or less.

Here, if the detection result of the illuminance sensor 100 is the first threshold value or less (step S26: YES), the transparent display 1 determines that the luminance of the first space SP1 is higher than the luminance of the image displayed on the screen 20, and the process proceeds to step S27. In step S27, the transparent display 1 controls the state of the first lighting 110 so as to be in the second state. Specifically, the transparent display 1 controls appropriately the state of the first lighting 110 so that the detection result of the illuminance sensor 100 is larger than the first threshold value, that is, the luminance of the first space SP1 becomes higher than the luminance of the image displayed on the screen 20. The transparent display 1 controls the state of the first lighting 110 so as to switch to the second state if being in the first state and, as necessary, further the light amount of the first lighting 110 so as to be increased in stages. Thereafter, the process proceeds to step S28.

Then, in this state, the predetermined image is displayed on the screen 20 of the transparent display panel 10 according to the above instruction from the first user U1. In this case, the luminance near the transparent display panel 10 in the first space SP1 is higher than the luminance of the image displayed on the screen 20. For this reason, the image displayed on the screen 20 can be visually recognized from the first user U1, but has difficulty in being visually recognized from the second user U2 of cannot be visually recognized therefrom (see FIG. 3).

Meanwhile, in step S25, if the "visual recognition OK" is selected by the first user U1, in other words, if the "visual recognition NG" is not selected by the first user U1 (step S25: NO), the process proceeds to step S28 without controlling the illumination sensor 110 so as to be changed. Further, in step S26, if the detection result of the illuminance sensor 100 is larger than the first threshold value (step S26: NO), the transparent display 1 determines that the luminance near the display layer 13 in the first space SP1 is higher than the luminance of the image displayed on the screen 20. Then, the process proceeds to step S28 without controlling the state of the first lighting 110 so as to be changed.

In step S28, in this state, the predetermined image is displayed on the screen 20 according to the above instruction from the first user U1. However, in this case, the luminance in the first space SP1 becomes darker than the luminance of the image displayed on the screen 20. Therefore, the image displayed on the screen 20 can be visually recognized by each of the first user U1 and the second user U2 (see FIG. 2).

Thereafter, it is determined which "visual recognition NG" or "visual recognition OK" is selected as the visual recognition state by the first user U1 (step S29). For example, it is determined whether the "visual recognition OK" is selected by the first user U1. If the "visual recognition OK" is selected by the first user U1 (step S29: YES), the process returns to step S23 and the transparent display 1 control the state of the first lighting 110 so as to switch from the second state to the first state. Meanwhile, if the "visual recognition NG" is selected by the first user U1 (step S29: NO), the process returns to step S26 and the first lighting 110 is appropriately controlled based on the detection result of the illumination sensor 100.

As explained above, in the transparent display 1 of the second embodiment as well, the convenience can be improved as in the first embodiment, and a new way of using the transparent display 1 becomes possible. Furthermore, in the second embodiment, since the transparent display 1 controls the state of the first lighting 110 based on the detection result of the illumination sensor 100, the state of the first lighting 110 can be controlled more appropriately and, for example, unnecessary lighting of the first lighting 110 can also be suppressed.

Modification Example of Second Embodiment

As described above, in the second embodiment, by controlling the state of the first lighting 110 lighting the first space SP1, that is, by setting the state of the first lighting 110 to the second state, the luminance in the first space SP1 is higher than the luminance of the image displayed on the screen 20 of the transparent display panel 10. However, the method of setting the luminance in the first space SP1 to this luminance is not limited to controlling the state of the first lighting 110. For example, the state of the first lighting 110 may be controlled, and further the state of the pixels forming the image displayed on the screen 20 may be controlled. Specifically, the pixels forming the image may be controlled so as to lower its luminance. Consequently, the luminance in the first space SP1 can be more reliably made higher than the luminance of the image displayed on the screen 20.

Third Embodiment

FIG. 15 is a flowchart showing one example of an image display processing of a transparent display according to a third embodiment. One example of image display control in the transparent display of third embodiment will be described by using FIG. 15. Note that a basic configuration of the transparent display of the third embodiment is the same as or common of that of the first embodiment.

In the transparent display 1 of the third embodiment, in causing the transparent display panel 10 to display the image based on the operation/instruction of the first user U1, the first lighting 110 is controlled according to additional information added to the image, as one example. For example, the transparent display 1 determines whether hidden information for hiding the image is contained in the additional information with respect to the second user U2, and controls the state of the first lighting 110 so as to switch from the first state to the second state if the hidden information is contained in the additional information.

Here, the additional information is information added to the image, for example, information such as attributes. Further, the hidden information is information indicating that the first user U1 wants to hide the image from the second user U2 in the second space SP2. For example, if the image contains confidential information and like are added. As one example, in causing the transparent display panel 10 to display the image according to the instruction from the first user U1, the transparent display 1 determines whether confidential attribute information is added as the additional information to the image data. Then, when the confidential attribute information is added, the transparent display controls the state of the first lighting 110 so as to change from the first state to the second state. Further, the additional information is not particularly limited, and may be, for example, information on the "visual recognition NG" and the like arbitrarily set by the first user U1.

For example, as shown in FIG. 15, the transparent display 1 of the third embodiment performs the following operations: the power becomes an on-state in step S31; when the first user U1 performs an operation to instruct causing the screen 20 to display the image (step S32); and in step S33, it is determined whether the image contains the additional information. In the third embodiment, the transparent display 1 determines whether there is the additional information including the hidden information. Here, if the image has the additional information including the hidden information (step S33: YES), the transparent display 1 proceeds to step S34 and controls the state of the first lighting 110 so as to switch to the second state. Step S34 is a step similar to step S5 of the first embodiment, and the transparent display 1 controls the first lighting 110 so as to switch to the second state if being in the first state and maintains the second state if being in the second state.

Thereafter, the transparent display causes the screen 20 to display a predetermined image according to the above instruction of the first user U1 (step S35), and the process returns to step S32. In this case, since the illumination light source 112 of the first lighting 110 is lit, the image displayed on the screen 20 can be visually recognized from the first user U1, but has difficulty in being visually recognized from the second user U2, or cannot be visually recognized therefrom (see FIG. 3).

Meanwhile, if the image does not have the additional information containing the hidden information (step S33: NO), the process proceeds to step S36 without controlling the state of the first lighting 110 so as to be changed. Step S36 is a step similar to step S3 of the first embodiment, and controls the first lighting 110 so as to be changed to the first state. That is, the transparent display 1 controls the first lighting 110 so as to switch to the first state if being in the second state and maintains the first state if being in the first state. At this time, it is preferable that the second lighting 120 is also controlled in the same manner as the first lighting 110. However, it is not necessary to control the second lighting 120.

Thereafter, in step S37, the transparent display causes the screen 20 to display the predetermined image according to the above instruction from the first user U1, and then the process returns to step S32. In this case, since the illumination light source 112 of the first lighting 110 is off, the image displayed on the screen 20 can be visually recognized by each of the first user U1 and the second user U2 (see FIG. 2).

As explained above, in the transparent display 1 of the third embodiment as well, the convenience can be improved as in the first embodiment, and a new way of using the transparent display 1 becomes possible. Furthermore, in the third embodiment, the state of the first lighting 110 is controlled based on the additional information added to the image displayed on the screen, so that the state of the first lighting 110 can appropriately be controlled without requiring any operation by the first user U1.

Other Embodiment

Although the embodiments of the present invention have been specifically described above, the present invention is not limited to the above-described embodiments and can be modified in various ways without departing from the scope thereof. In each embodiment, components can be added, deleted, replaced, and the like except for essential components. Unless specifically limited, each component may be singular or plural. The present invention also includes a form obtained by combinations of the respective embodiments and their modification examples.

In the above-described embodiment, a liquid crystal display, which is a liquid crystal display device, has been described as one example of the transparent display apparatus of the present invention, but the present invention can also be applied to other self-luminous display devices such as an organic EL device. The functions described in the embodiments are similarly applicable to any display device including the display layer (pixels) that can transition between the transparent state and the non-transparent state. Further, the size of the screen of the display device is applicable from a small type to a large type without particular limitation.

Further, in the above-described embodiment, the example in which characteristic control is performed by the controller has been explained as the transparent display apparatus of the present invention, but the configuration of the transparent display apparatus of the present invention is not limited to this and the computer system externally connected to the controller of the transparent display apparatus may perform the similar characteristic control.

What is claimed is:

1. A transparent display apparatus comprising:
a first substrate having a first surface;
a second substrate having a second surface on an opposite side of the first surface;
a display layer arranged between the first substrate and the second substrate and having pixels that can transition between a transparent state transmitting background light and a non-transparent state displaying an image;
a display region provided in a region where the first substrate, the second substrate, and the display layer overlap;
a controller controlling a state of the pixels of the display layer; and
the image displayed in the display region from a side of the first surface and a background on a side of the second surface being visible, and the image displayed in the display region from a side of the second surface and the background on the first surface side being visible,
wherein the controller controls a state of a first lighting that illuminates an inside of a first space in causing the display layer to display the image toward a first user in the first space on the first surface side, and
wherein a light from the first lighting reaches the first space without passing through the first substrate and the second substrate.

2. The transparent display apparatus according to claim 1, wherein the controller controls, based on an operation by the first user, the state of the first lighting so as to switch between a first state in which illumination light source of the first lighting is turned off and a second state in which the illumination light source is turned on.

3. The transparent display apparatus according to claim 2, further comprising a sensor device for detecting a viewpoint of the first user,
wherein the controller:
causes the display layer to display a selection image for selecting the first state or the second state toward the first user; and
controls the state of the first lighting so as to switch between the first state and the second state based on the selection image that the first user gazes at from detection information of the sensor device.

4. The transparent display apparatus according to claim 2, wherein in switching the state of the first lighting from the first state to the second state, the controller controls the state of the first lighting so that luminance of the first space is higher than luminance of the image displayed on the display layer.

5. The transparent display apparatus according to claim 4, further comprising an illumination sensor for detecting luminance in the first space,
   wherein the controller controls the state of the first lighting so as to increase a light amount of the illumination light source based on a detection result of the illuminance sensor.

6. The transparent display apparatus according to claim 4, wherein the controller controls the state of the pixels so that the luminance in the first space is higher than the luminance of the image displayed on the display layer.

7. The transparent display apparatus according to claim 6, further comprising an illumination sensor for detecting luminance in the first space,
   wherein the controller controls the state of the first lighting so as to decrease luminance of the image displayed on the display layer according to a detection result of the illumination sensor.

8. The transparent display apparatus according to claim 1, wherein the controller controls the state of the first lighting according to additional information added to the image in causing the display layer to display the image toward the first user.

9. The transparent display apparatus according to claim 8, wherein the controller:
   determines whether the additional information contains hidden information; and
   controls the state of the first lighting so as to change from a first state in which the illumination light source of the first lighting is turned off to a second state in which the illumination light source is turned on when the additional information contains the hidden information.

10. The transparent display apparatus according to claim 1,
   wherein the display layer is a liquid crystal layer, and
   a liquid crystal light source that supplies light source light to the liquid crystal layer is provided at a position that does not overlap the display region.

* * * * *